US012328241B2

(12) United States Patent
Nakano et al.

(10) Patent No.: US 12,328,241 B2
(45) Date of Patent: *Jun. 10, 2025

(54) INFORMATION MANAGEMENT METHOD

(71) Applicant: Panasonic Intellectual Property Corporation of America, Torrance, CA (US)

(72) Inventors: Toshihisa Nakano, Osaka (JP); Motoji Ohmori, Osaka (JP); Tomoyuki Hirota, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/205,627

(22) Filed: Jun. 5, 2023

(65) Prior Publication Data

US 2023/0318944 A1 Oct. 5, 2023

Related U.S. Application Data

(62) Division of application No. 17/968,910, filed on Oct. 19, 2022, now Pat. No. 11,711,277, which is a
(Continued)

(30) Foreign Application Priority Data

May 13, 2013 (JP) .................................. 2013-101135

(51) Int. Cl.
*H04L 43/04* (2022.01)
*H04L 9/40* (2022.01)
(Continued)

(52) U.S. Cl.
CPC .......... *H04L 43/04* (2013.01); *H04L 12/2809* (2013.01); *H04L 12/2825* (2013.01);
(Continued)

(58) Field of Classification Search
CPC . H04L 43/04; H04L 12/2809; H04L 12/2834; H04L 41/0806; H04L 41/085; H04L 63/101
(Continued)

(56) References Cited

U.S. PATENT DOCUMENTS 7,076,550 B1 7/2006 Noguchi et al.
2004/0128515 A1 7/2004 Rabin et al.
(Continued)

FOREIGN PATENT DOCUMENTS

CN 1361882 7/2002
CN 1729671 2/2006
(Continued)

OTHER PUBLICATIONS

International Search Report issued Jul. 29, 2014 in International (PCT) Application No. PCT/JP2014/002503.
(Continued)

*Primary Examiner* — Suraj M Joshi
(74) *Attorney, Agent, or Firm* — Wenderoth, Lind & Ponack, L.L.P.

(57) ABSTRACT

A server apparatus receives a device ID indicating one electrical home appliance among one or more electrical home appliances and a gateway ID indicating that the one electrical home appliance belongs to a same owner, a same group, or a same home as the one or more electrical home appliances, determines whether or not the one electrical home appliance is a newly connected electrical home appliance, using a management database that manages device IDs indicating the one or more electrical home appliances and the gateway ID, and when it is determined made that the one electrical home appliance is a newly connected electrical home appliance, provides an information device, which is associated with the gateway ID and which differs from the
(Continued)

one electrical home appliance, with notification information for confirming whether or not it is to be permitted to collect the log information from the one electrical home appliance.

8 Claims, 39 Drawing Sheets

Related U.S. Application Data division of application No. 17/386,170, filed on Jul. 27, 2021, now Pat. No. 11,509,549, which is a division of application No. 16/539,327, filed on Aug. 13, 2019, now Pat. No. 11,108,660, which is a division of application No. 15/906,179, filed on Feb. 27, 2018, now Pat. No. 10,425,298, which is a division of application No. 14/413,535, filed as application No. PCT/JP2014/002503 on May 12, 2014, now Pat. No. 9,948,526.

(51) Int. Cl.
  *H04L 12/28* (2006.01)
  *H04L 41/0806* (2022.01)
  *H04L 41/085* (2022.01)

(52) U.S. Cl.
  CPC ...... *H04L 12/2834* (2013.01); *H04L 41/0806* (2013.01); *H04L 41/085* (2013.01); *H04L 63/101* (2013.01)

(58) Field of Classification Search
  USPC ......................................................... 709/224
  See application file for complete search history.

(56) References Cited

U.S. PATENT DOCUMENTS

| | | | |
|---|---|---|---|
| 2004/0133448 | A1 | 7/2004 | Higashi et al. |
| 2004/0133803 | A1 | 7/2004 | Rabin et al. |
| 2006/0218272 | A1 | 9/2006 | Murakami |
| 2007/0140326 | A1 | 6/2007 | Singh |
| 2007/0277182 | A1 | 11/2007 | Chen et al. |
| 2008/0199184 | A1 | 8/2008 | Takeshita et al. |
| 2008/0309461 | A1 | 12/2008 | Mizuki et al. |
| 2009/0235244 | A1* | 9/2009 | Enomori ............... H04L 67/34 717/170 |
| 2009/0249002 | A1 | 10/2009 | Imahara et al. |
| 2009/0285115 | A1 | 11/2009 | Sakai |
| 2010/0008645 | A1 | 1/2010 | Katata et al. |
| 2010/0121900 | A1 | 5/2010 | Sakai et al. |
| 2011/0138064 | A1* | 6/2011 | Rieger ............... H04N 21/436 707/715 |
| 2012/0030050 | A1 | 2/2012 | Rey et al. |
| 2012/0072586 | A1 | 3/2012 | Kurahashi |
| 2014/0244768 | A1* | 8/2014 | Shuman ............... H04W 4/70 709/206 |

FOREIGN PATENT DOCUMENTS

| | | |
|---|---|---|
| CN | 101137998 | 3/2008 |
| CN | 101546180 | 9/2009 |
| CN | 101741663 | 6/2010 |
| CN | 102439986 | 5/2012 |
| EP | 1 959 588 | 8/2008 |
| EP | 2 416 549 | 2/2012 |
| JP | 2005-25663 | 1/2005 |
| JP | 2006-25259 | 1/2006 |
| JP | 4309087 | 8/2009 |
| JP | 2009-538484 | 11/2009 |
| JP | 4757900 | 8/2011 |
| WO | 2008/026252 | 3/2008 |

OTHER PUBLICATIONS

US Office Action dated Mar. 23, 2017 in U.S. Appl. No. 14/413,535.
US Final Office Action dated Sep. 21, 2017 in U.S. Appl. No. 14/413,535.
Notice of Allowability issued Jun. 5, 2019 in U.S. Appl. No. 15/906,179.
Notice of Allowability issued Apr. 28, 2021 in U.S. Appl. No. 16/539,327.
Office Action issued Mar. 24, 2022 in U.S. Appl. No. 17/386,170.
Notice of Allowability issued Mar. 3, 2023 in U.S. Appl. No. 17/968,910.

\* cited by examiner

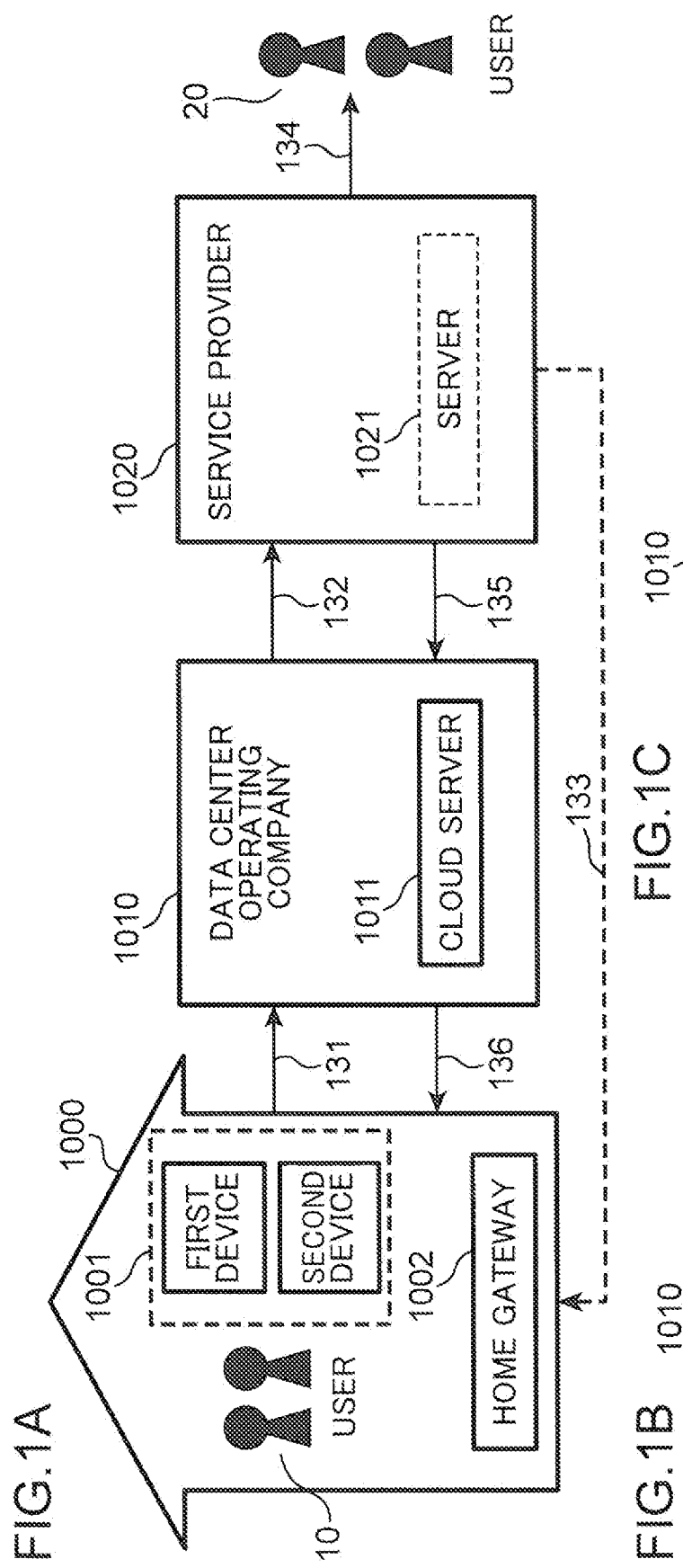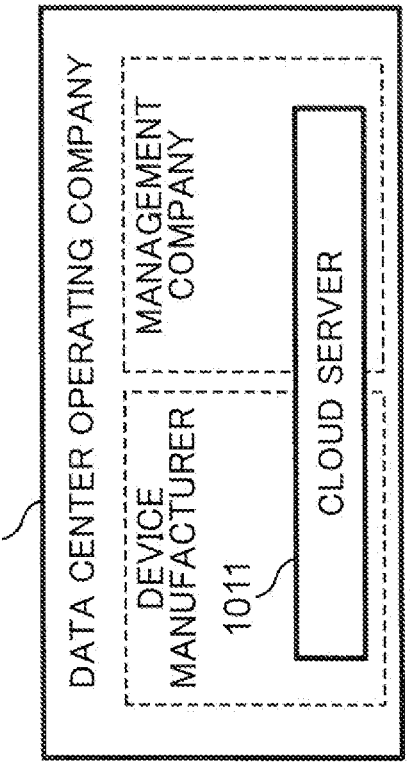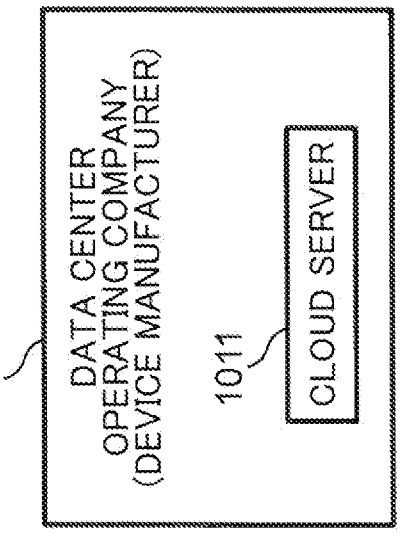

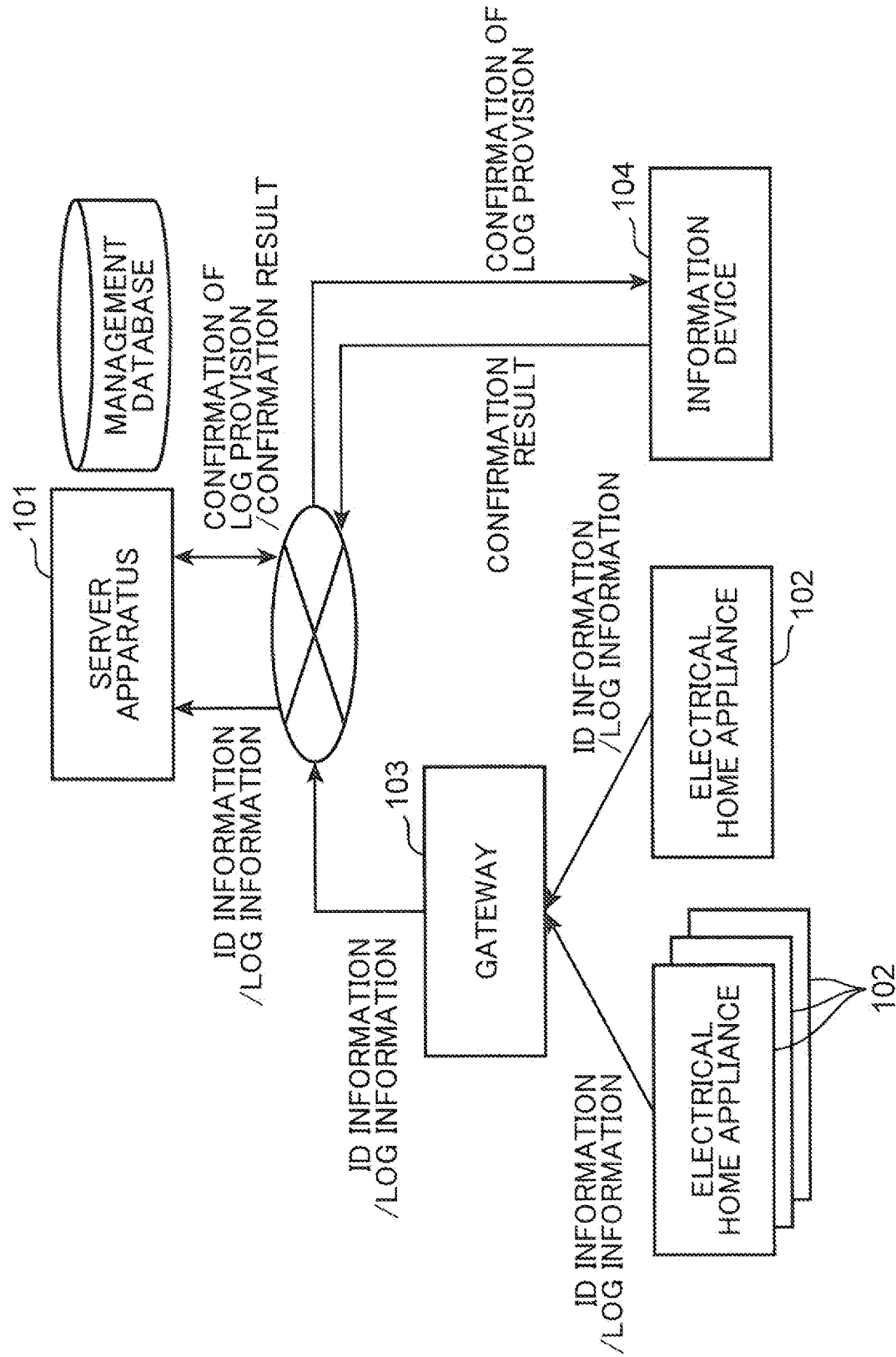

FIG.7

| GATEWAY ID | DEVICE ID | INCLUDE DISPLAY YES:○ NO:× | PROVIDE LOG YES:○ NO:× | POWER SUPPLY STATE ON:○ OFF:× |
|---|---|---|---|---|
| 32456389 | 123456 | × | ○ | ○ |
| | 896023 | ○ | ○ | ○ |
| | ⋮ | ⋮ | ⋮ | ⋮ |
| | 789012 | × | ○ | ○ |
| 95749291 | 014259 | ○ | × | × |
| | ⋮ | ⋮ | ⋮ | ⋮ |
| | 256789 | × | ○ | ○ |

FIG.8

| DEVICE ID | ADDRESS INFORMATION |
|---|---|
| 014259 | "EMAIL" abcdefg@jp.aaa.com |
| 896023 | "IP ADDRESS" 173.168.52.14 |
| : | : |

FIG.9

| GATEWAY ID | DEVICE ID | INCLUDE DISPLAY YES:○ NO:× | PROVIDE LOG YES:○ NO:× | POWER SUPPLY STATE ON:○ OFF:× | LOG PROVISION STATUS |
|---|---|---|---|---|---|
| 32456389 | 123456 | × | ○ | ○ | ALL |
| | 896023 | ○ | ○ | ○ | POWER SUPPLY ON/OFF |
| | ⋮ | ⋮ | ⋮ | ⋮ | ⋮ |
| 95749291 | 789012 | × | ○ | ○ | POWER SUPPLY ON/OFF VIEWED PROGRAM |
| | 014259 | ○ | × | × | — |
| | ⋮ | ⋮ | ⋮ | ⋮ | ⋮ |
| | 256789 | × | ○ | ○ | ALL |

FIG.11

YOUR TV DOES NOT PERMIT PROVISION OF LOG INFORMATION REGARDING VIEWED PROGRAMS. BY PERMITTING PROVISION, YOU WILL BE AWARDED XXX POINTS. PERMIT PROVISION OF LOG INFORMATION REGARDING VIEWED PROGRAMS?
(VIEW PRIVACY POLICY HERE)

YES　　NO

FIG.13

| HEADER PORTION | DATA PORTION | INCLUDE DISPLAY<br>YES: ○<br>NO: × |
|---|---|---|
| 01 | 896023 | ○ |

FIG.14

| HEADER PORTION | DATA PORTION | INCLUDE DISPLAY<br>YES: ○<br>NO: × |
|---|---|---|
| 10 | 32456389 | × |

RECEIVED LOG

| DEVICE ID | DATE/TIME | LOG |
|---|---|---|
| 896023 | 2013/4/4 13:00 | POWER SUPPLY TURNED ON |
| | 2013/4/4 13:00 | 4 ch SELECTED: PROGRAM NAME "ABC" |
| | 2013/4/4 13:55 | 6 ch SELECTED: PROGRAM NAME "XYZ" |
| | 2013/4/4 14:40 | POWER SUPPLY TURNED OFF |

RECORDED LOG

| DEVICE ID | DATE/TIME | LOG |
|---|---|---|
| 896023 | 2013/4/4 13:00 | POWER SUPPLY TURNED ON |
| | 2013/4/4 14:40 | POWER SUPPLY TURNED OFF |

FIG.25

| DEVICE ID | LOG PROVISION STATUS |
|---|---|
| 896023 | POWER SUPPLY TURNED ON/OFF |

RECEIVED LOG

| DEVICE ID | DATE/TIME | LOG |
|---|---|---|
| 896023 | 2013/4/4 13:00 | POWER SUPPLY TURNED ON |
| | 2013/4/4 14:40 | POWER SUPPLY TURNED OFF |

RECORDED LOG

| DEVICE ID | DATE/TIME | LOG |
|---|---|---|
| 896023 | 2013/4/4 13:00 | POWER SUPPLY TURNED ON |
| | 2013/4/4 14:40 | POWER SUPPLY TURNED OFF |

| DEVICE ID | INCLUDE DISPLAY YES:○ NO:× | PROVIDE LOG YES:○ NO:× | POWER SUPPLY STATE ON:○ OFF:× |
|---|---|---|---|
| 123456 | × | ○ | ○ |
| 896023 | ○ | ○ | ○ |
| ⋮ | ⋮ | ⋮ | ⋮ |

FIG.37

| ATTRIBUTE ID | DEVICE ID | INCLUDE DISPLAY YES:○ NO:× | PROVIDE LOG YES:○ NO:× | POWER SUPPLY STATE ON:○ OFF:× |
|---|---|---|---|---|
| 32456389 | 123456 | × | ○ | ○ |
| | 896023 | ○ | ○ | ○ |
| | ⋮ | ⋮ | ⋮ | ⋮ |
| | 789012 | × | ○ | ○ |
| 95749291 | 014259 | ○ | × | × |
| | ⋮ | ⋮ | ⋮ | ⋮ |
| | 256789 | × | ○ | ○ |

INFORMATION MANAGEMENT METHOD

TECHNICAL FIELD

The present invention relates to a method for managing information in an information management system that manages log information indicating usage of one or more electrical devices.

BACKGROUND ART

In recent years, the number of electrical home appliances or AV (audio visual) devices that can be connected to a network in the home have increased. Accordingly, systems are being evaluated which enable a cloud operator to collect various types of log information including an operation history of an electrical home appliance or an AV device via the network. It is hoped that the collection of such log information will enable services that best match the lifestyle of a user to be provided.

However, these systems are still under evaluation and require further improvements to be practically viable.

CITATION LIST

Patent Literature

Patent Literature 1: Japanese Patent No. 4757900
Patent Literature 2: Japanese Unexamined Patent Application Publication No. 2006-25259
Patent Literature 3: Japanese Patent No. 4309087

SUMMARY OF INVENTION

The present invention has been made in order to solve the problem described above and an object thereof is to provide a method for confirming with a user as to whether or not it is permitted to collect log information from an electrical device, regardless of whether or not the electrical device has a display or regardless of a size of a display included in the electrical device.

A method according to an aspect of the present invention is used for managing information in an information management system that manages log information indicating a usage state of one or more electrical devices, the method including: receiving via a first network a device ID indicating one electrical device among the one or more electrical devices and an attribute ID indicating that the one electrical device belongs to a same owner, a same group, or a same home as the one or more electrical devices; determining whether or not the one electrical device is newly connected to the information management system, using a first database that manages device IDs indicating the one or more electrical devices and attribute IDs associated with the device IDs; and when it is determined that the one electrical device is newly connected to the information management system, providing via a second network an information display apparatus, which is associated with the attribute ID and which differs from the one electrical device, with notification information for confirming whether or not it is permitted to collect the log information from the one electrical device.

According to the aspect of the present invention, whether or not it is to be permitted to collect the log information from the electrical device can be confirmed with a user regardless of whether or not the electrical device has a display or regardless of a size of a display included in the electrical device.

BRIEF DESCRIPTION OF DRAWINGS

FIG. 1A is a diagram showing an overview of service provided by an information management system according to a present embodiment, FIG. 1B is a diagram showing an example where a device manufacturer corresponds to a data center operating company, and FIG. 1C is a diagram showing an example where both or one of a device manufacturer and a management company correspond to a data center operating company.

FIG. 2 is a diagram showing a configuration of an information management system according to a first embodiment of the present invention.

FIG. 7 is a diagram showing an example of management information according to the first embodiment.

FIG. 8 is a diagram showing an example of address information according to the first embodiment.

FIG. 9 is a diagram showing an example of management information including a provision status of log information according to the first embodiment.

FIG. 11 is a diagram showing another example of notification information according to the first embodiment.

FIG. 13 is a diagram showing an example of a device ID according to the first embodiment.

FIG. 14 is a diagram showing an example of a gateway ID according to the first embodiment.

FIG. 25 is a diagram showing an example of filtering information according to the third embodiment.

FIG. 37 is a diagram showing an example of management information according to the fifth embodiment.

DESCRIPTION OF EMBODIMENTS

Figure 3:
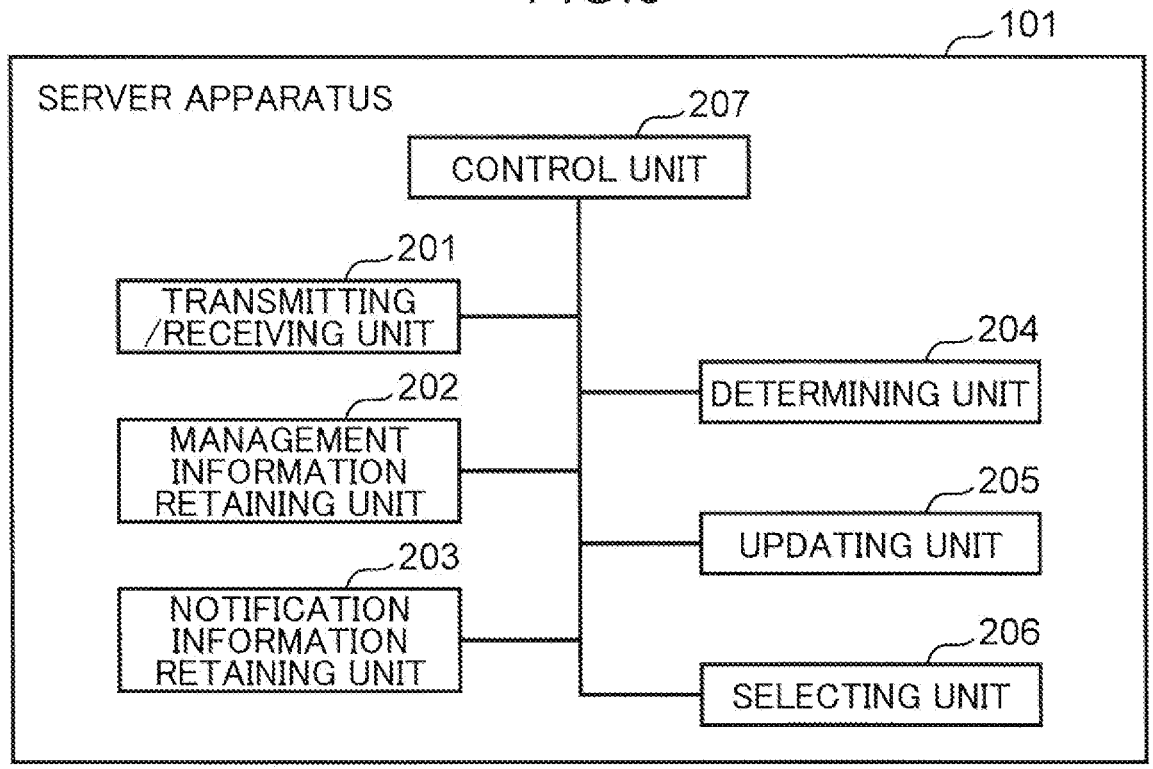
FIG. 3 is a diagram showing a configuration of a server apparatus according to the first embodiment of the present invention.

Various types of log information that are collected by a cloud operator from electrical home appliances or AV devices via a network are information related to privacy of users and cannot be collected without the users' knowledge. Therefore, permission must be individually obtained from the users in order to collect log information. In such cases, there are users who wish to set whether or not log information is to be provided for each electrical home appliance such as a user who does not mind providing log information of a refrigerator to a cloud operator but does not want to provide log information of a television to the cloud operator. Therefore, permission with respect to whether log information is to be collected or not is conceivably required for each electrical home appliance.

On the other hand, using the system is a hassle for a user since whether or not log information is to be provided must be actively set for each of a plurality of electrical home appliances which are owned by the user and which are connected to the network. In addition, obtaining permission to collect log information related to privacy requires notifying disclaimers, contract terms and conditions, or the like to the user. Among electrical home appliances, it is difficult to display disclaimers, contract terms and conditions, or the like on electrical home appliances such as a washing machine and a refrigerator which are not equipped with displays or electrical home appliances which are only equipped with simplified displays and, as a result, it is difficult to accept some kind of setting based on image display. Therefore, the user cannot directly set whether or not log information is to be provided for electrical home appliances which are not equipped with displays or electrical home appliances which are only equipped with simplified displays.

In order to solve such problems, the present inventors have arrived at the invention according to the aspects described below.

A method according to an aspect of the present invention is used for managing information in an information management system that manages log information indicating usage of one or more electrical devices, the method including: receiving via a first network a device ID indicating one electrical device among the one or more electrical devices and an attribute ID indicating that the one electrical device belongs to a same owner, a same group, or a same home as the one or more electrical devices; determining whether or not the one electrical device is newly connected to the information management system, using a first database that manages device IDs indicating the one or more electrical devices and attribute IDs associated with the device IDs; and when it is determined that the one electrical device is a newly connected to the information management system, providing via a second network an information display apparatus, which is associated with the attribute ID and which differs from the one electrical device, with notification information for confirming whether or not it is to be permitted to collect the log information from the one electrical device.

According to this configuration, when one electrical device for which permission regarding whether or not log information is to be collected has not been obtained is newly installed, notification information for confirming whether or not collection of log information of the one electrical device is to be permitted is provided to an information display apparatus that differs from the one electrical device. In other words, notification information for confirming whether or not collection of log information of the one electrical device is to be permitted is provided, not to the one electrical device from which log information is to be actually collected, but to an information display apparatus that differs from the one electrical device. As a result, whether or not collection of log information of an electrical device is to be permitted can be confirmed with a user regardless of whether or not the electrical device has a display or regardless of a size of a display included in the electrical device.

In addition, the user need not actively set whether or not collection of log information of a newly installed electrical device is to be permitted and can complete settings with respect to the collection of log information by simply responding to notification information that is provided to the user. Therefore, the user can determine whether or not log information of an electrical device is to be provided in accordance with notification information and, at the same time, readily set whether or not log information of an electrical device is to be provided.

Furthermore, in the aspect described above, favorably, the device ID and the attribute ID are received from a gateway connected to the one electrical device via the first network, and when it is determined that the one electrical device is newly connected to the information management system, the notification information is provided via the second network to the information display apparatus associated with the attribute ID of the one electrical device, using a second database that manages the attribute ID and the associated information display apparatus.

According to this configuration, a device ID and an attribute ID are received from a gateway connected to the one electrical device via the first network. When it is determined that the one electrical device is newly connected to the information management system, the notification information is provided via the second network to the information display apparatus associated with the attribute ID of the one electrical device using a second database that manages the attribute ID and the associated information display apparatus.

Therefore, since a device ID and an attribute ID are received from a gateway connected to the one electrical device, even when the device ID and the attribute ID cannot be directly acquired from the one electrical device, the device ID and the attribute ID can be acquired via the gateway connected to the one electrical device.

In addition, in the aspect described above, favorably, the device ID indicating the one electrical device and an attribute ID indicating that the one electrical device belongs to the same owner, the same group, or the same home as the one or more electrical devices are received from a gateway connected to the one electrical device via the first network, the notification information is transmitted to the gateway via the second network when it is determined that the one electrical device is newly connected to the information management system, and the notification information is provided via the gateway to the information display apparatus based on a device ID that indicates the information display apparatus and is managed by the gateway.

According to this configuration, since the notification information is provided via the gateway to the information display apparatus based on a device ID indicating the information display apparatus, the device ID is managed by the gateway, even when the notification information cannot be directly transmitted to the information display apparatus, the notification information can be transmitted to the information display apparatus via the gateway that is connected to the information display apparatus.

Furthermore, in the aspect described above, favorably, permission information for permitting collection of log information from the one electrical device is received via the second network from the information display apparatus in response to the notification information, whether or not the log information of the one electrical device is to be collected is set to the gateway via the first network, based on the permission information, and the log information of the one electrical device based on the setting content is received from the gateway via the first network.

According to this configuration, permission information for permitting collection of log information of the one electrical home appliance is received via the second network from the information display apparatus in response to the notification information. Whether or not the log information of the one electrical device is to be collected is set with respect to the gateway via the first network based on the permission information. The log information of the one electrical device that is transmitted by the gateway based on the setting content is received via the first network.

Therefore, since whether or not the log information of the one electrical device is to be collected is set with respect to the gateway via the first network based on the permission information, a determination of whether or not log information is to be provided need not be made by the electrical device and the configuration of the electrical device can be simplified.

In addition, in the aspect described above, favorably, the device ID and the attribute ID are received from the one electrical device via the first network, and when it is determined that the one electrical device is newly connected to the information management system, the notification information is provided via the second network to the information display apparatus associated with the attribute ID of the one electrical device using a second database that manages the attribute ID and the associated information display apparatus.

According to this configuration, since the device ID and the attribute ID are received from the one electrical device and the notification information is provided to the information display apparatus associated with the attribute ID of the one electrical device, the device ID and the attribute ID can be directly received from the one electrical device without involving the gateway and, at the same time, the notification information can be directly provided to the information display apparatus.

Furthermore, in the aspect described above, favorably, a plurality of information display apparatuses include the information display apparatus, a power supply state indicating whether a power supply is in an on state or an off state is acquired from the plurality of information display apparatuses via the first network, an information display apparatus whose power supply is in an on state among the plurality of information display apparatuses is identified based on the acquired power supply state, and the notification information is provided to the identified information display apparatus.

According to this configuration, since the notification information is provided to an information display apparatus whose power supply is in an on state among the plurality of information display apparatuses, the notification information can be immediately presented to the user when the information display apparatus acquires the notification information.

In addition, in the aspect described above, favorably, a plurality of information display apparatuses include the information display apparatus, a power supply state indicating whether a power supply is in an on state or an off state and an operation status indicating whether or not an operation is in progress are acquired from the plurality of information display apparatuses via the first network, an information display apparatus whose power supply is in an on state and which is in operation among the plurality of information display apparatuses is identified based on the acquired power supply state and operation status, and the notification information is provided to the identified information display apparatus.

According to this configuration, since the notification information is provided to an information display apparatus whose power supply is in an on state and which is being operated among the plurality of information display apparatuses, the notification information can be immediately presented to the user when the information display apparatus acquires the notification information.

Furthermore, in the aspect described above, favorably, a plurality of information display apparatuses include the information display apparatus, and the notification information is provided to all of the plurality of information display apparatuses.

Since the notification information is provided to all of the plurality of information display apparatuses, the user can confirm the notification information using any of the plurality of information display apparatuses.

In addition, in the aspect described above, favorably, the notification information for confirming whether or not it is to be permitted to collect the log information from another electrical device among the one or more electrical devices, it being not permitted to collect at least a part of the log information from the other electrical device is provided to the information display apparatus.

According to this configuration, the notification information for confirming whether or not collection of the log information is to be permitted for another electrical device for which collection of at least a part of the log information is not permitted among the one or more electrical devices is provided to the information display apparatus.

Therefore, since confirmation is obtained on whether or not collection of the log information is to be permitted for another electrical device for which collection of at least a part of the log information is not permitted among the one or more electrical devices, confirmation on whether or not collection of the log information is to be permitted can be obtained once again with respect to the other electrical device for which collection of at least a part of the log information is not permitted.

Furthermore, in the aspect described above, favorably, transmission of the log information to the one electrical device is to be permitted when it is permitted to collect the log information of the one electrical device, based on the notification information.

According to this configuration, since transmission of the log information to the one electrical device is to be permitted when collection of the log information of the one electrical device is permitted, the log information can be collected from the one electrical device.

In addition, in the aspect described above, favorably, the one electrical device does not include a display.

According to this configuration, whether or not log information is to be collected can be set with respect to an electrical device that does not include a display.

Furthermore, in the aspect described above, favorably, permission information for permitting collection of the log information from the one electrical device is received from the information display apparatus via the second network, in response to the notification information, and the log information of the one electrical device is collected via the first network based on the permission information.

According to this configuration, permission information for permitting collection of log information of the one electrical device is received via the second network from the information display apparatus in response to the notification information. The log information of the one electrical device is collected via the first network based on the permission information.

Therefore, the log information can be directly collected from the one electrical device.

In addition, in the aspect described above, favorably, permission information for permitting collection of the log information from the one electrical device is received from the information display apparatus via the second network, in response to the notification information, whether or not the log information of the one electrical device is to be collected is set to the one electrical device via the first network information indicating, based on the permission information, and the log information of the one electrical device, based on the setting content is received from the one electrical device via the first network.

According to this configuration, permission information for permitting collection of log information of the one electrical device is received via the second network from the information display apparatus in response to the notification information. Whether or not the log information of the one electrical device is to be collected is set with respect to the one electrical device via the first network based on the permission information. The log information of the one electrical device that is transmitted by the one electrical device based on the setting content is received via the first network.

Therefore, since whether or not the log information of the one electrical device is to be collected is set with respect to the one electrical device, the one electrical device can transmit only log information for which collection is permitted and can reduce the amount of log information to be transmitted.

Furthermore, in the aspect described above, favorably, the first network is a same network as the second network.

According to this configuration, since the first network that receives a device ID and an attribute ID and the second network that transmits notification information are the same network, a transmission path for transmitting information can be simplified.

All of the embodiments described below represent specific examples of the present invention. Numerical values, shapes, components, steps, and orders of steps described in the following embodiments are merely examples and are not intended to limit the present invention. In addition, components not described in independent claims representing highest concepts among the components of the following embodiments are to be described as arbitrary components. Furthermore, respective contents of all embodiments can be combined with one another.

(Overview of Service to be Provided)

First, an overview of service provided by an information management system according to a present embodiment will be described.

FIG. 1A is a diagram showing an overview of service provided by the information management system according to the present embodiment, FIG. 1B is a diagram showing an example where a device manufacturer corresponds to a data center operating company, and FIG. 1C is a diagram showing an example where both or one of a device manufacturer and a management company correspond to a data center operating company. The information management system includes a group 1000, a data center operating company 1010, and a service provider 1020.

The group 1000 is, for example, a corporation, an organization, and a home and may be of any size. The group 1000 includes a plurality of devices 1001 including a first device and a second device as well as a home gateway 1002. The plurality of devices 1001 include devices capable of connecting to the Internet (for example, a smartphone, a personal computer (PC), and a television) as well as devices incapable of connecting to the Internet by themselves (for example, a lighting fixture, a washing machine, and a refrigerator). The plurality of devices 1001 may include devices that become capable of connecting to the Internet via the home gateway 1002 even though the devices are incapable of connecting to the Internet by themselves. In addition, a user 10 uses the plurality of devices 1001 in the group 1000.

The data center operating company 1010 includes a cloud server 1011. The cloud server 1011 is a virtual server that links with various devices via the Internet. The cloud server 1011 mainly manages huge data (big data) and the like which are difficult to handle using ordinary database management tools or the like. The data center operating company 1010 manages data, manages the cloud server 1011, and operates a data center that carries out such management. Details of services provided by the data center operating company 1010 will be described later.

In this case, the data center operating company 1010 is not limited to companies that only manage data or only manage the cloud server 1011. For example, as shown in FIG. 1B, when a device manufacturer responsible for developing or manufacturing one device among the plurality of devices 1001 also manages data or manages the cloud server 1011, the device manufacturer corresponds to the data center operating company 1010. In addition, the data center operating company 1010 is not limited to one company. For example, as shown in FIG. 1C, when a device manufacturer and a management company manage data or manage the cloud server 1011 in cooperation or in a shared manner, both of or one of the device manufacturer and the management company correspond to the data center operating company 1010.

The service provider 1020 includes a server 1021. The server 1021 as referred to herein may be of any scale and includes, for example, a memory in a personal PC. In addition, there may be cases where the service provider 1020 does not include the server 1021.

Moreover, in the information management system described above, the home gateway 1002 is not essential. For example, the home gateway 1002 is unnecessary in a case where the cloud server 1011 performs all data management. In addition, there may be cases where there are no devices that are incapable of connecting to the Internet by themselves such as when all devices in the home are connected to the Internet.

Next, a flow of information in the information management system will be described.

First, the first device or the second device in the group 1000 transmits respective pieces of log information to the cloud server 1011 of the data center operating company 1010. The cloud server 1011 accumulates log information of the first device or the second device (an arrow 131 in FIG. 1A). In this case, log information is information indicating an operation state, an operation date/time, or the like of the plurality of devices 1001. For example, while log information includes a viewing history of a television set, video recording reservation information of a recorder, an operation date/time of a washing machine, an amount of laundry, an opening/closing time/date of a refrigerator, the number of times a refrigerator had been opened/closed, or the like, log information is not limited to these types of information and may include various types of information that can be acquired from various types of devices. Moreover, the log information may be directly provided by the plurality of devices 1001 themselves to the cloud server 1011 via the Internet. In addition, the log information may be temporarily accumulated by the home gateway 1002 from the plurality of devices 1001 and provided to the cloud server 1011 by the home gateway 1002.

Next, the cloud server 1011 of the data center operating company 1010 provides the accumulated log information to the service provider 1020 in fixed units. In this case, the fixed unit may be a unit that can be provided by the data center operating company 1010 to the service provider 1020 by organizing accumulated information or a unit that is requested by the service provider 1020. In addition, while information is to be provided in fixed units as described above, information need not necessarily be provided in fixed units and an amount of information to be provided may vary according to circumstances. When necessary, the log information is stored in a server 1021 owned by the service provider 1020 (an arrow 132 in FIG. 1A).

Subsequently, the service provider 1020 organizes the log information into information matching the service to be provided to the user and provides the organized information to the user. The user to which the information is provided may be the user 10 of the plurality of devices 1001 or an outside user 20. As for a method of providing information to the users 10 and 20, for example, the information may be directly provided to the users 10 and 20 by the service provider 1020 (arrows 133 and 134 in FIG. 1A). In addition, as for a method of providing information to the user 10, for example, the information may be directly provided to the user 10 once again via the cloud server 1011 of the data center operating company 1010 (arrows 135 and 136 in FIG. 1A). Furthermore, the cloud server 1011 of the data center operating company 1010 may organize the log information into information matching the service to be provided to the user and provide the organized information to the service provider 1020.

Moreover, the user 10 may differ from the user 20 or may be the same as the user 20.

First Embodiment 1.1 Configuration of Information Management System

FIG. 2 is a diagram showing a configuration of an information management system according to a first embodiment of the present invention. As shown in FIG. 2, the information management system includes a server apparatus 101, an electrical home appliance 102, a gateway 103, and an information device 104. The information management system manages log information indicating usage of one or more electrical devices.

In FIG. 2, the electrical home appliance 102, the gateway 103, and the information device 104 are positioned in the home. The gateway 103 is connected to the server apparatus 101 via a network such as the Internet.

The electrical home appliance 102 is, for example, an air conditioner, an AV device such as a television set, a washing machine, an illumination device, an electronic shutter, an intercom, or the like. Moreover, the electrical home appliance 102 may be any kind of electrical appliance which is used in the home and which is capable of collecting log information such as residential equipment, a sensor for measuring and sensing residential environment, and an electric vehicle.

The electrical home appliance 102 is connected to the server apparatus 101 via the gateway 103. The electrical home appliance 102 transmits ID information (a device ID) that enables each electrical home appliance 102 to be uniquely identified or log information to the server apparatus 101.

In addition, when a new electrical home appliance 102 is connected to the gateway 103, the server apparatus 101 presents a message confirming whether or not provision (transmission) of log information of the new electrical home appliance 102 is to be permitted to the information device 104 owned by the user of the new electrical home appliance 102 and receives a confirmation result by the user. When provision of log information is permitted, the new electrical home appliance 102 provides ID information and log information to the server apparatus 101. The server apparatus 101 stores and manages log information using a managed database (a management database).

The information device 104 is a smartphone, a mobile phone, a tablet computer, or the like. The information device 104 includes a display capable of displaying various types of information. The information device 104 is connected to the server apparatus 101 via a network such as the Internet.

1.2 Configuration of Server Apparatus 101

Next, a detailed configuration of the server apparatus 101 according to the first embodiment will be described.

FIG. 3 is a diagram showing a configuration of a server apparatus according to the first embodiment of the present invention. As shown in FIG. 3, the server apparatus 101 includes a transmitting/receiving unit 201, a management information retaining unit 202, a notification information retaining unit 203, a determining unit 204, an updating unit 205, a selecting unit 206, and a control unit 207.

The server apparatus 101 includes a microprocessor, a RAM (random access memory), a ROM (read only memory), a hard disk, and the like which are not specifically illustrated. The RAM, the ROM, and the hard disk store a computer program. As the microprocessor operates according to the computer program, functions of the server apparatus 101 are realized.

Moreover, the respective functional blocks of the server apparatus 101 including the transmitting/receiving unit 201, the management information retaining unit 202, the notification information retaining unit 203, the determining unit 204, the updating unit 205, the selecting unit 206, and the control unit 207 may be realized by an LSI (Large Scale Integration) that is typically an integrated circuit. The respective functional blocks may be individually configured as single chips. Alternatively, one or more functional blocks or a part of a functional block may constitute a single chip.

While the term LSI has been used herein, other terms such as an IC (Integrated Circuit), a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

(1) Transmitting/Receiving Unit 201

The transmitting/receiving unit 201 receives a gateway ID, a device ID, and user input information accepted by the electrical home appliance 102 from the gateway 103. A gateway ID is an identifier that enables a gateway to be uniquely identified. A device ID is an identifier that enables an electrical home appliance to be uniquely identified.

In addition, the transmitting/receiving unit 201 transmits notification information that is retained by the notification information retaining unit 203 to the information device 104. Notification information is, for example, a message to the user in order to obtain permission for provision or collection of log information of the electrical home appliance 102. User input information is, for example, response information (permission information) indicating whether or not the user permits collection of log information.

The transmitting/receiving unit 201 receives, via the first network, a device ID indicating one electrical device among one or more electrical devices (electrical home appliances 102) and an attribute ID (a gateway ID) indicating that the one electrical device belongs to a same owner, a same group, or a same home as the one or more electrical devices. The transmitting/receiving unit 201 receives the device ID and the attribute ID (the gateway ID) from the gateway 103 connected to the one electrical device via the first network.

(2) Management Information Retaining Unit 202

The management information retaining unit 202 retains and manages management information such as an association between the gateway ID of the gateway 103 and the device ID of the electrical home appliance 102, whether or not the electrical home appliance 102 has a display, whether or not the electrical home appliance 102 is providing log information, and whether or not the current power supply state of the electrical home appliance 102 is an on state.

FIG. 7 is a diagram showing an example of management information according to the first embodiment. In the example shown in FIG. 7, an electrical home appliance corresponding to a device ID "123456" (hereinafter referred to as an electrical home appliance A) and an electrical home appliance corresponding to a device ID "896023" (hereinafter referred to as an electrical home appliance B) are connected to a gateway corresponding to a gateway ID "32456389". It is shown that the electrical home appliance A does not have a display, provides log information (has permitted provision of log information), and a current power supply state is an on state. It is also shown that the electrical home appliance B has a display, provides log information (has permitted provision of log information), and a current power supply state is an on state.

In this manner, the management information associates a gateway ID and a device ID with each other and, at the same time, associates whether or not a display is included, whether or not log information is to be provided, and whether or not a power supply state is an on state with each electrical home appliance ID.

In addition, the management information retaining unit 202 retains and manages address information for transmitting notification information that is retained by the notification information retaining unit 203.

FIG. 8 is a diagram showing an example of address information according to the first embodiment. The example in FIG. 8 shows that an email address "abcdefg@jp.aaa.com" is associated and managed as address information of an electrical home appliance corresponding to a device ID "01429" and an IP (Internet Protocol) address "173.168.52.14" is associated and managed as address information of an electrical home appliance corresponding to the device ID "896023". In this manner, address information includes an email address or an IP address of the electrical home appliance 102 or the information device 104 that is a transmission destination of the notification information.

Furthermore, in addition to an association between a gateway ID and a device ID, whether or not the electrical home appliance 102 has a display, whether or not the electrical home appliance 102 is providing log information, and whether or not the current power supply state of the electrical home appliance 102 is an on state, the management information retaining unit 202 also retains and manages a provision status of log information as management information.

FIG. 9 is a diagram showing an example of management information including a provision status of log information according to the first embodiment.

The example in FIG. 9 shows that an electrical home appliance corresponding to a device ID "123456" does not have a display, provides log information (permits provision of log information), a current power supply state is an on state, and permits provision of all log information.

On the other hand, it is shown that the electrical home appliance corresponding to a device ID "896023" has a display, provides log information (permits provision of log information), a current power supply state is an on state, and only permits provision of log information related to turning on/off the power supply among the plurality of types of log information.

For example, when the electrical home appliance is a television set, log information includes a date/time when power had been turned on, a number of a selected channel, a date/time when power had been turned off, and the like. The example in FIG. 9 shows that, while provision of the date/time when power had been turned on/off is permitted, provision of the number of a selected channel is not permitted.

(3) Notification Information Retaining Unit 203

The notification information retaining unit 203 retains notification information to be transmitted to the electrical home appliance 102 or the information device 104 via the gateway 103.

Figure 10:
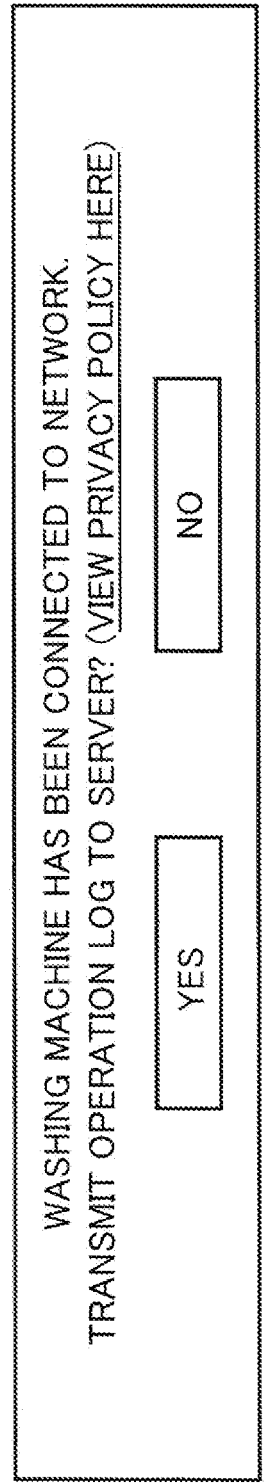
FIG. 10 is a diagram showing an example of notification information according to the first embodiment.

FIG. 10 is a diagram showing an example of notification information according to the first embodiment. The example in FIG. 10 shows a message for confirming with the user whether or not collection of log information of a new washing machine is to be permitted when the washing machine is connected to a network.

FIG. 11 is a diagram showing another example of notification information according to the first embodiment. The example in FIG. 11 shows a message for obtaining permission from the user for provision (collection) of further log information of an electrical home appliance in a case where the electrical home appliance has already permitted provision (collection) of log information but the permission only applies to a part of the log information.

Moreover, the management information retaining unit 202 and the notification information retaining unit 203 may be the same database or may be different databases.

(4) Determining Unit 204

The determining unit 204 determines whether or not an electrical home appliance corresponding to the device ID received by the transmitting/receiving unit 201 is a newly connected device based on the gateway ID and the device ID received by the transmitting/receiving unit 201 and the management information retained by the management information retaining unit 202.

For example, when the gateway ID "32456389" and the device ID "896023" are received by the transmitting/receiving unit 201, the determining unit 204 collates the received gateway ID and device ID with the management information shown in FIG. 7 and determines whether or not the received gateway ID and device ID already exist in the management information. In this example, since the IDs already exist in the management information, the determining unit 204 makes a determination that the electrical home appliance is not a newly connected electrical home appliance.

In addition, the determining unit 204 determines whether or not there is an electrical home appliance having a display or an information device based on the gateway ID received by the transmitting/receiving unit 201 and the management information retained by the management information retaining unit 202.

For example, when the gateway ID "32456389" is received, the determining unit 204 collates the received gateway ID with the management information shown in FIG. 7 and determines whether or not there is a device having a display among the plurality of devices associated with the received gateway ID. In this example, since the device represented by the device ID "896023" has a display, the determining unit 204 determines that there is a device having a display.

The determining unit 204 determines whether or not one electrical device (the electrical home appliance 102) is a newly connected electrical device using a first database (the management information retaining unit 202) that manages device IDs indicating one or more electrical devices (electrical home appliances) and attribute IDs (gateway IDs). When it is determined that the one electrical device is a newly connected electrical device, the transmitting/receiving unit 201 provides notification information for confirming whether or not collection of log information of the one electrical device is to be permitted to an information display apparatus which is associated with the attribute ID (the gateway ID) and which differs from the one electrical device via the second network.

Moreover, the information display apparatus may be another electrical device among the one or more electrical devices which differs from the one electrical device and which has a display. Favorably, the other electrical device is, for example, an electrical home appliance such as a television set. Alternatively, the information display apparatus may be the information device 104.

Furthermore, when the information display apparatus is the information device 104, for example, a size of the display included in the information display apparatus is favorably 3 inches to 7 inches and a resolution of the display included in the information display apparatus is favorably 480 by 320, 960 by 640, 1136 by 640, or the like.

In addition, when it is determined that the one electrical device is a newly connected electrical device, the transmitting/receiving unit 201 provides the notification information via the second network to an information display apparatus corresponding to the attribute ID of the one electrical device using a second database (the management information retaining unit 202) that manages the attribute ID (the gateway ID) and the information display apparatus in association with each other.

(5) Updating Unit 205

The updating unit 205 updates management information retained by the management information retaining unit 202 when the determining unit 204 determines that the electrical home appliance corresponding to the device ID received by the transmitting/receiving unit 201 is a newly connected electrical home appliance.

In addition, the updating unit 205 updates management information retained by the management information retaining unit 202 in accordance with user input information that is received by the transmitting/receiving unit 201.

Figure 12:
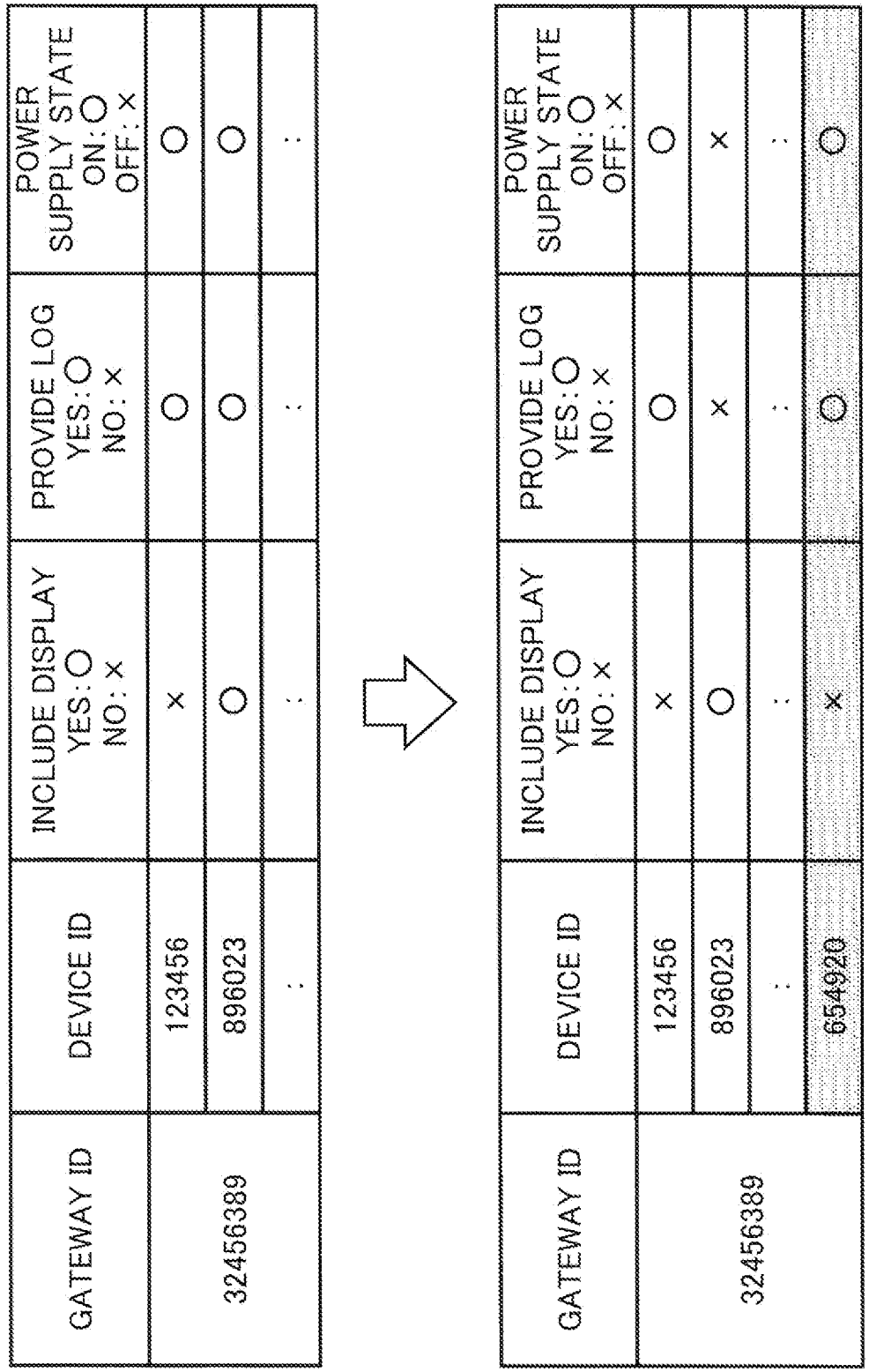
FIG. 12 is a diagram showing an example of an updating process of management information retained by a server apparatus according to the first embodiment of the present invention.

FIG. 12 is a diagram showing an example of an updating process of management information retained by a server apparatus according to the first embodiment of the present invention. In FIG. 12, an upper table represents management information before update and a lower table represents management information after update. For example, in a case where the transmitting/receiving unit 201 receives information regarding an electrical home appliance whose device ID is "654920" and which does "not include a display", the determining unit 204 determines that the electrical home appliance is a newly connected electrical home appliance, and when the transmitting/receiving unit 201 further receives information permitting collection of log information, the updating unit 205 updates the management information as shown in FIG. 12. Furthermore, the updating unit 205 also reflects whether or not a power supply state of the newly connected electrical home appliance is an on state on the management information. The example in FIG. 12 shows that the current power supply state of the newly connected electrical home appliance is an on state.

(6) Selecting Unit 206

When the determining unit 204 determines that there is an electrical home appliance having a display or an information device, based on the gateway ID received by the transmitting/receiving unit 201 and the management information retained by the management information retaining unit 202, the selecting unit 206 selects all electrical home appliances and information devices which correspond to the gateway ID and which have a display.

Alternatively, when the determining unit 204 determines that there is an electrical home appliance having a display or an information device, based on the gateway ID received by the transmitting/receiving unit 201 and the management information retained by the management information retaining unit 202, the selecting unit 206 may select all electrical home appliances and information devices whose current power supply state is an on state among electrical home appliances and information devices which correspond to the gateway ID and which have a display.

(7) Control Unit 207

The control unit 207 realizes functions of the server apparatus 101 by managing and controlling the transmitting/receiving unit 201, the management information retaining unit 202, the notification information retaining unit 203, the determining unit 204, the updating unit 205, and the selecting unit 206 described above.

1.3 Configuration of Electrical Home Appliance 102

Next, a detailed configuration of the electrical home appliance 102 according to the first embodiment will be described.

Figure 4:
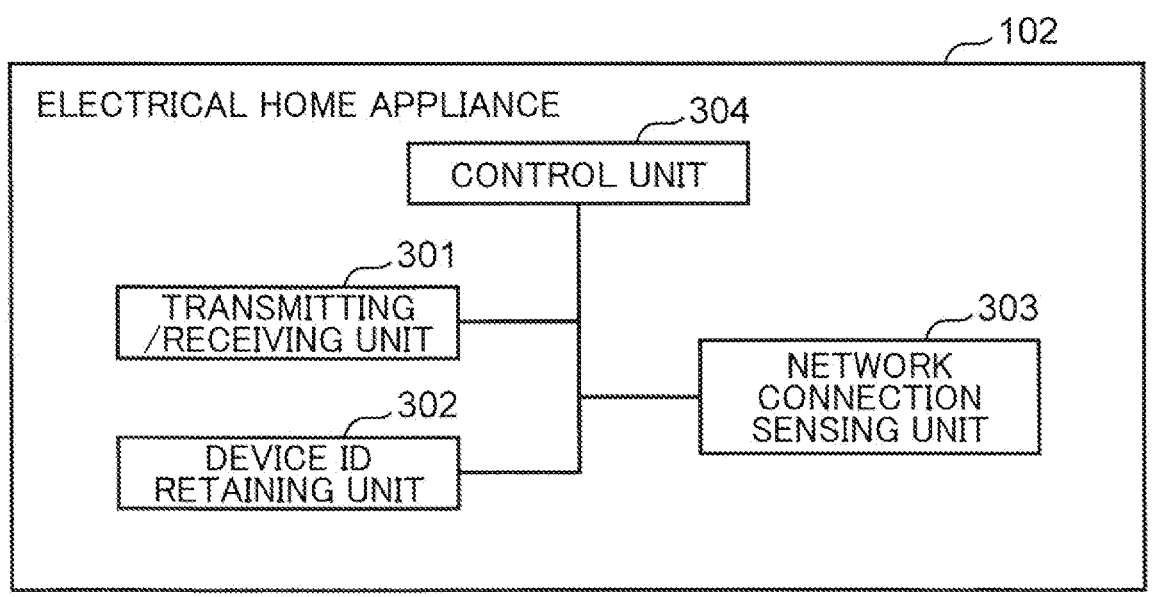
FIG. 4 is a diagram showing a configuration of an electrical home appliance according to the first embodiment of the present invention.

FIG. 4 is a diagram showing a configuration of an electrical home appliance according to the first embodiment of the present invention. As shown in FIG. 4, the electrical home appliance 102 includes a transmitting/receiving unit 301, a device ID retaining unit 302, a network connection sensing unit 303, and a control unit 304.

The electrical home appliance 102 includes a microprocessor, a RAM, a ROM, a hard disk, and the like which are not specifically illustrated. The RAM, the ROM, and the hard disk store a computer program. As the microprocessor operates according to the computer program, functions of the electrical home appliance 102 are realized.

Moreover, the respective functional blocks of the transmitting/receiving unit 301, the device ID retaining unit 302, the network connection sensing unit 303, and the control unit 304 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

(1) Transmitting/Receiving Unit 301

The transmitting/receiving unit 301 transmits the device ID retained by the device ID retaining unit 302 to the gateway 103.

(2) Device ID Retaining Unit 302

The device ID retaining unit 302 retains an identifier (a device ID) for uniquely identifying an electrical home appliance.

FIG. 13 is a diagram showing an example of a device ID according to the first embodiment. In the example shown in FIG. 13, the device ID includes information (a header portion) "01" indicating that the identifier is a device ID, the device ID (a data portion) "896023", and information representing features of the electrical home appliance such as whether or not a display is included (in this case, information reading "display included").

(3) Network Connection Sensing Unit 303

The network connection sensing unit 303 senses that the electrical home appliance 102 has been connected to the network (connected to the gateway 103).

(4) Control Unit 304

The control unit 304 realizes functions of the electrical home appliance 102 by managing and controlling the transmitting/receiving unit 301, the device ID retaining unit 302, and the network connection sensing unit 303 described above.

1.4 Configuration of Gateway 103

Next, a detailed configuration of the gateway 103 according to the first embodiment will be described.

Figure 5:
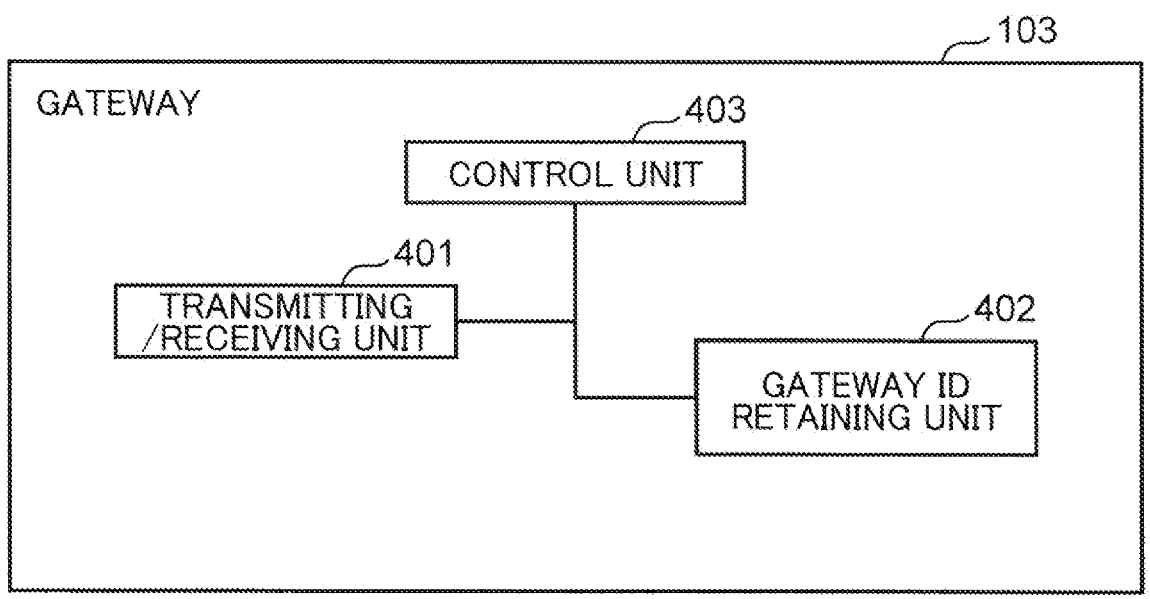
FIG. 5 is a diagram showing a configuration of a gateway according to the first embodiment of the present invention.

FIG. 5 is a diagram showing a configuration of a gateway according to the first embodiment of the present invention. As shown in FIG. 5, the gateway 103 includes a transmitting/receiving unit 401, a gateway ID retaining unit 402, and a control unit 403.

The gateway 103 includes a microprocessor, a RAM, a ROM, a hard disk, and the like which are not specifically illustrated. The RAM, the ROM, and the hard disk store a computer program. As the microprocessor operates according to the computer program, functions of the gateway 103 are realized.

Moreover, the respective functional blocks of the transmitting/receiving unit 401, the gateway ID retaining unit 402, and the control unit 403 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

(1) Transmitting/Receiving Unit 401

The transmitting/receiving unit 401 receives, from the electrical home appliance 102, the device ID of the electrical home appliance 102.

In addition, the transmitting/receiving unit 401 transmits the device ID received from the electrical home appliance 102 and the gateway ID retained by the gateway ID retaining unit 402 to the server apparatus 101.

(2) Gateway ID Retaining Unit 402

The gateway ID retaining unit 402 retains an identifier (a gateway ID) for uniquely identifying the gateway 103.

FIG. 14 is a diagram showing an example of a gateway ID according to the first embodiment. In the example shown in FIG. 14, the gateway ID includes information (a header portion) "10" indicating that the identifier is a gateway ID, the gateway ID (a data portion) "32456389", and information representing features of the gateway such as whether or not a display is included (in this case, information reading "display not included").

(3) Control Unit 403

The control unit 403 realizes functions of the gateway 103 by managing and controlling the transmitting/receiving unit 401 and the gateway ID retaining unit 402 described above.

1.5 Configuration of Information Device 104

Next, a detailed configuration of the information device 104 according to the first embodiment will be described.

Figure 6:
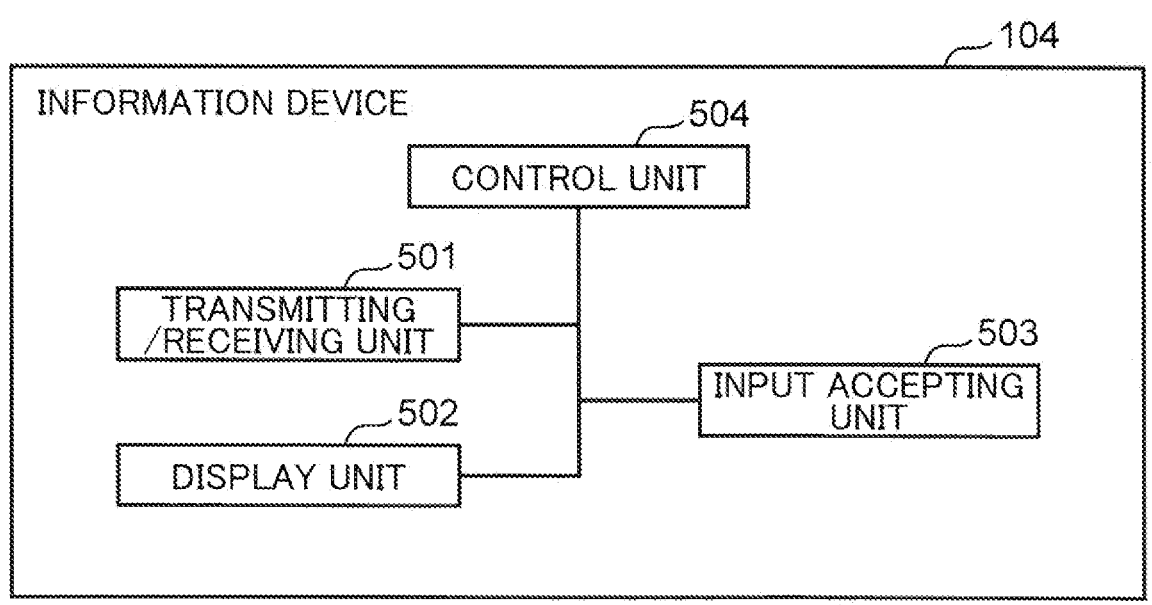
FIG. 6 is a diagram showing a configuration of an information device according to the first embodiment of the present invention.

FIG. 6 is a diagram showing a configuration of an information device according to the first embodiment of the present invention. As shown in FIG. 6, the information device 104 includes a transmitting/receiving unit 501, a display unit 502, an input accepting unit 503, and a control unit 504.

The information device 104 includes a microprocessor, a RAM, a ROM, a hard disk, and the like which are not specifically illustrated. The RAM, the ROM, and the hard disk store a computer program. As the microprocessor operates according to the computer program, functions of the information device 104 are realized.

Moreover, the respective functional blocks of the transmitting/receiving unit 501, the display unit 502, the input accepting unit 503, and the control unit 504 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

(1) Transmitting/Receiving Unit 501

The transmitting/receiving unit 501 receives notification information to be presented to the user from the server apparatus 101. In addition, the transmitting/receiving unit 501 transmits input information accepted by the input accepting unit 503 to the server apparatus 101.

(2) Display Unit 502

The display unit 502 displays a screen that presents the notification information received by the transmitting/receiving unit 501 to the user. Moreover, examples of notification information to be displayed are as shown in FIGS. 10 and 11.

(3) Input Accepting Unit 503

The input accepting unit 503 accepts a response (an input) by the user to the notification information (a message) displayed by the display unit 502.

For instance, in the example shown in FIG. 10, with respect to a confirmation message regarding provision of log information, the input accepting unit 503 accepts whether the user permits provision of log information ("yes" in the example shown in FIG. 10) or the user does not permit provision of log information ("no" in the example shown in FIG. 10).

In addition, when a plurality of types of log information can be provided with respect to one electrical home appliance, the input accepting unit 503 accepts a selection regarding whether or not log information is to be provided for each of the plurality of types of log information.

(4) Control Unit 504

The control unit 504 realizes functions of the information device 104 by managing and controlling the transmitting/receiving unit 501, the display unit 502, and the input accepting unit 503 described above.

1.6 Operation of Information Management System

An example of an operation for confirming connection of the electrical home appliance 102 to the network and whether log information of the electrical home appliance 102 is to be provided will now be described with reference to FIGS. 15 to 19.

Figure 15:
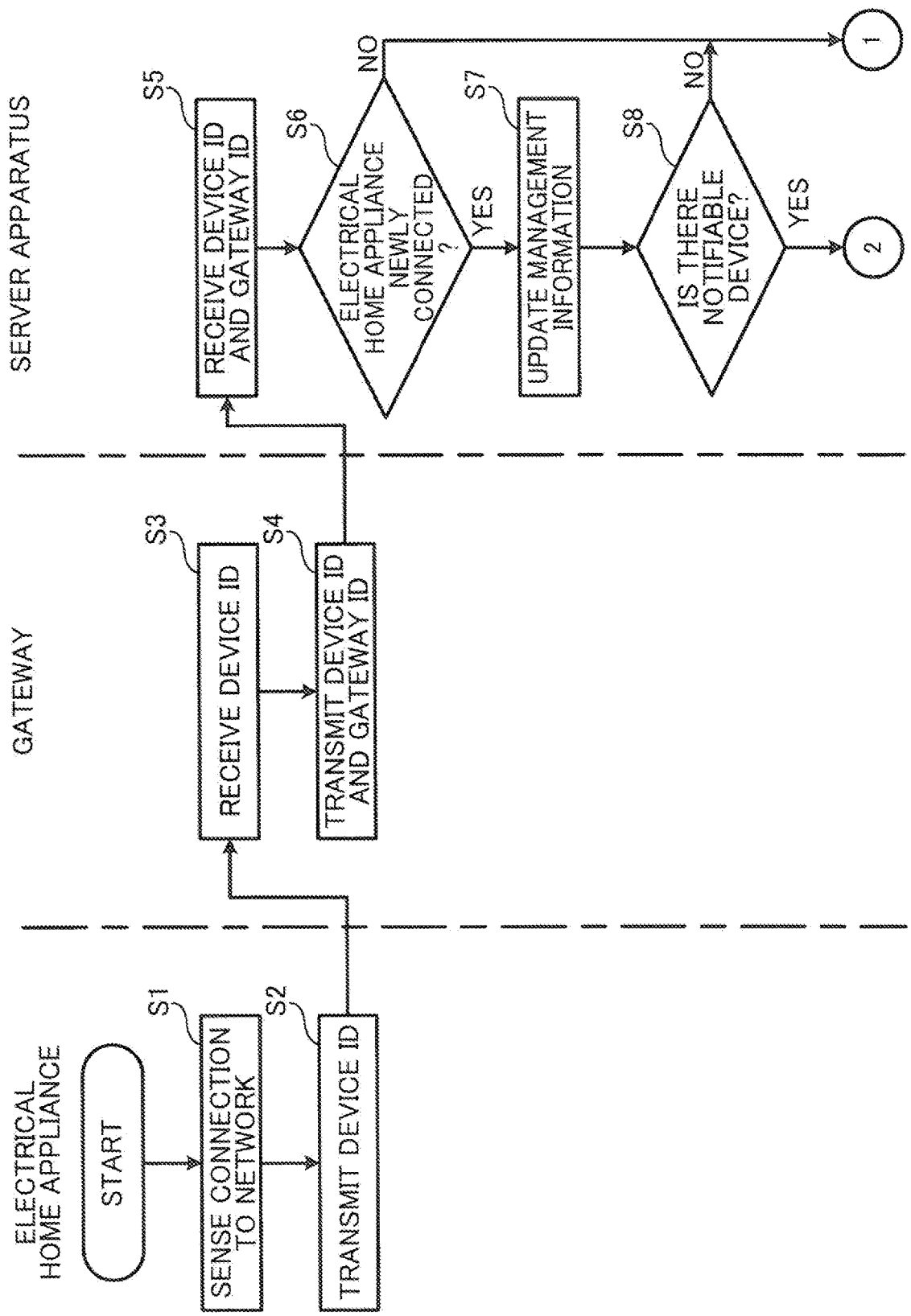
FIG. 15 is a first flow chart for describing an operation by the information management system according to the first embodiment of the present invention.
Figure 16:
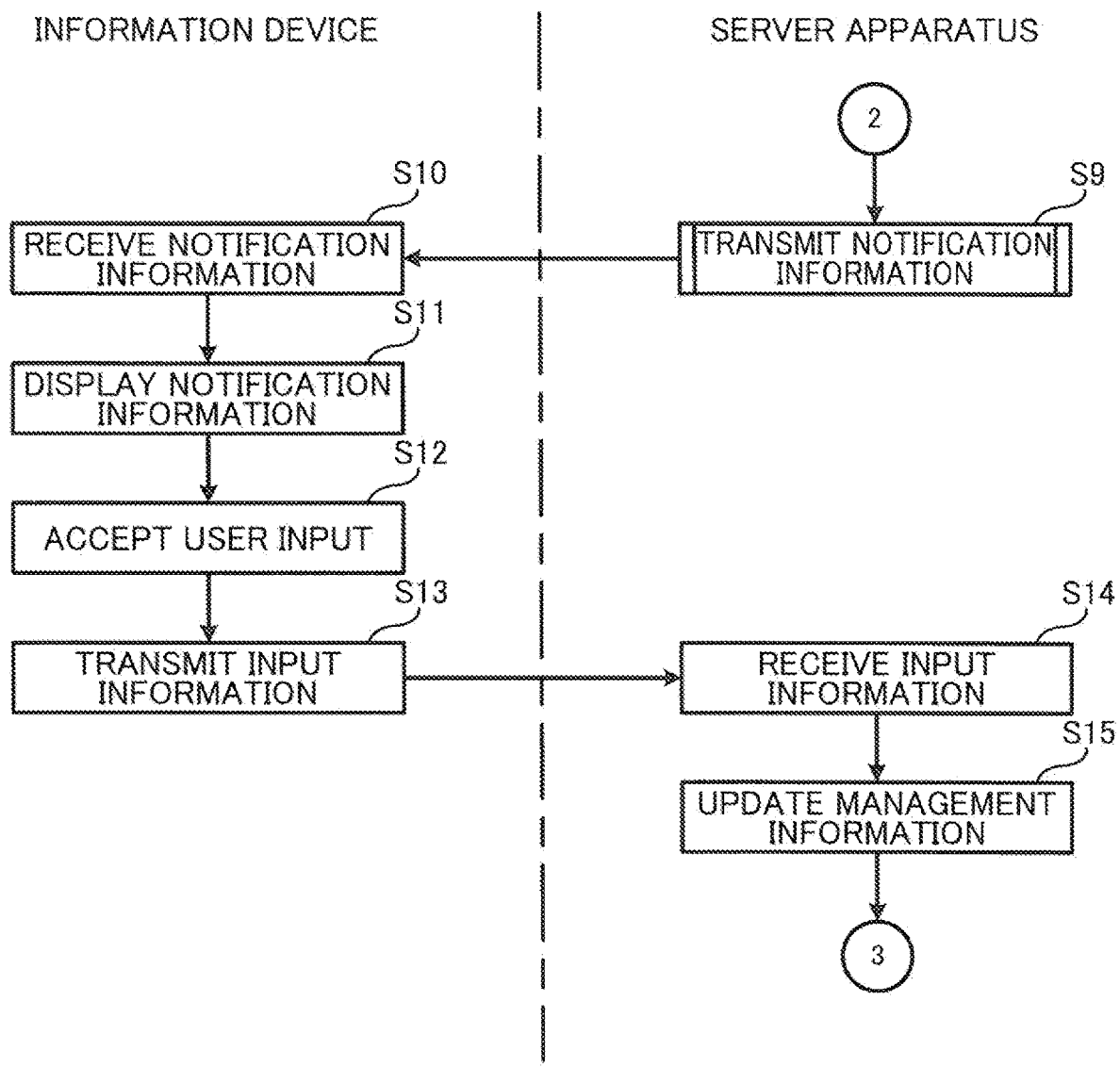
FIG. 16 is a second flow chart for describing an operation by the information management system according to the first embodiment of the present invention.
Figure 17:
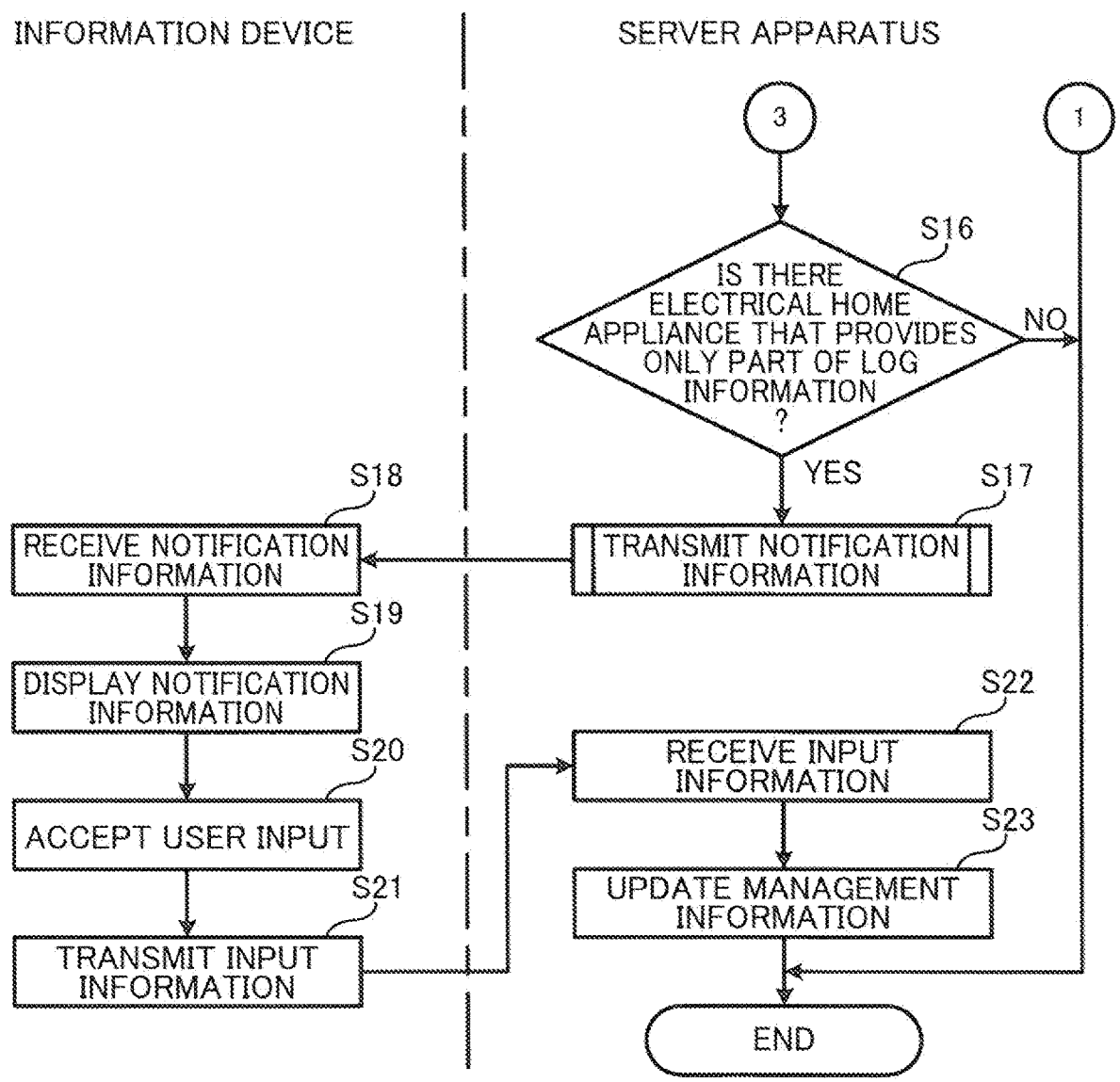
FIG. 17 is a third flow chart for describing an operation by the information management system according to the first embodiment of the present invention.

FIG. 15 is a first flow chart for describing an operation by the information management system according to the first embodiment of the present invention, FIG. 16 is a second flow chart for describing an operation by the information management system according to the first embodiment of the present invention, and FIG. 17 is a third flow chart for describing an operation by the information management system according to the first embodiment of the present invention.

First, the network connection sensing unit 303 of the electrical home appliance 102 senses that the electrical home appliance 102 has been connected to the network (connected to the gateway 103) (step S1).

When connection to the network is sensed, the transmitting/receiving unit 301 transmits the device ID regained by the device ID retaining unit 302 to the gateway 103 (step S2).

Next, the transmitting/receiving unit 401 of the gateway 103 receives the device ID transmitted by the electrical home appliance 102 (step S3).

Subsequently, the transmitting/receiving unit 401 transmits the received device ID and the gateway ID retained by the gateway ID retaining unit 402 to the server apparatus 101 (step S4).

Next, the transmitting/receiving unit 201 of the server apparatus 101 receives the device ID and the gateway ID transmitted by the gateway 103 (step S5).

Subsequently, based on the received device ID and gateway ID and the management information retained by the management information retaining unit 202, the determining unit 204 determines whether or not an electrical home appliance has been newly connected or, in other words, whether or not an electrical home appliance corresponding to the received device ID is a newly connected electrical home appliance (step S6).

Specifically, the determining unit 204 refers to the management information retained by the management information retaining unit 202 and determines whether or not there is a device ID matching the received device ID among the plurality of device IDs associated with the received gateway ID. When there is a device ID matching the received device ID among the plurality of device IDs associated with the received gateway ID, the determining unit 204 determines that the electrical home appliance corresponding to the received device ID is not a newly connected electrical home appliance. In addition, when there is no device ID matching the received device ID among the plurality of device IDs associated with the received gateway ID, the determining unit 204 determines that the electrical home appliance corresponding to the received device ID is a newly connected electrical home appliance.

At this point, when it is determined that an electrical home appliance is not newly connected or, in other words, when it is determined that the electrical home appliance corresponding to the received device ID is not a newly connected electrical home appliance (NO in step S6), the process is terminated.

On the other hand, when it is determined that an electrical home appliance is newly connected or, in other words, when it is determined that the electrical home appliance corresponding to the received device ID is a newly connected electrical home appliance (YES in step S6), the updating unit 205 updates the management information retained by the management information retaining unit 202 based on the received device ID and gateway ID (step S7). In other words, the updating unit 205 stores the received device ID and gateway ID in the management information retaining unit 202.

Next, based on the received gateway ID and the management information retained by the management information retaining unit 202, the determining unit 204 determines whether or not there is a notifiable device among the one or more electrical home appliances 102 or information devices 104 associated with the gateway 103 or, in other words, whether there is an electrical home appliance 102 having a display or an information device 104 (step S8). At this point, when it is determined that there is no electrical home appliance 102 having a display or information device 104 (NO in step S8), the process is terminated.

On the other hand, when it is determined that there is an electrical home appliance 102 having a display or an information device 104 (YES in step S8), the transmitting/receiving unit 201 transmits the notification information retained by the notification information retaining unit 203 to the electrical home appliance 102 having a display or the information device 104 (step S9). Moreover, in this case, the transmitting/receiving unit 201 transmits the notification information to the information device 104. In addition, the notification information retaining unit 203 may store notification information in accordance with a device ID or a type of electrical home appliance and the transmitting/receiving unit 201 may read out notification information corresponding to the received device ID or notification information corresponding to the type of the electrical home appliance that is identified by the received device ID from the notification information retaining unit 203.

Next, the transmitting/receiving unit 501 of the information device 104 receives the notification information transmitted by the server apparatus 101 (step S10).

Subsequently, the display unit 502 displays the received notification information (step S11).

The input accepting unit 503 then accepts an input (a response) by the user with respect to the notification information (step S12).

Next, the transmitting/receiving unit 501 transmits input information of the user as accepted by the input accepting unit 503 to the server apparatus 101 (step S13). In this case, the input information includes permission information indicating whether or not log information is to be provided.

Subsequently, the transmitting/receiving unit 201 of the server apparatus 101 receives the input information transmitted by the information device 104 (step S14).

Next, the updating unit 205 updates the management information retained by the management information retaining unit 202 in accordance with the permission information which is included in the input information and which indicates whether or not log information of the user is to be provided (step S15).

Subsequently, based on the received gateway ID and the management information retained by the management information retaining unit 202, the determining unit 204 of the server apparatus 101 determines whether or not there is an electrical home appliance that provides only a part of log information among the plurality of types of log information that can be provided (step S16). In other words, when an electrical home appliance is capable of providing a plurality of types of log information, whether or not log information is to be provided can be individually set for the plurality of types of log information. At this point, when it is determined that there is no electrical home appliance that provides only a part of log information among the plurality of types of log information that can be provided (NO in step S16), the process is terminated.

On the other hand, when it is determined that there is an electrical home appliance that provides only a part of log information among the plurality of types of log information that can be provided (YES in step S16), the transmitting/receiving unit 201 transmits the notification information retained by the notification information retaining unit 203 to the information device 104 (step S17). As shown, the transmitting/receiving unit 201 provides the information display apparatus (the information device 104) with notification information for confirming whether or not collection of log information is to be permitted for another electrical device for which collection of at least a part of the log information is not permitted among the one or more electrical devices (electrical home appliances 102).

Next, the transmitting/receiving unit 501 of the information device 104 receives the notification information transmitted by the server apparatus 101 (step S18).

Subsequently, the display unit 502 displays the received notification information (step S19).

The input accepting unit 503 then accepts an input (a response) by the user which corresponds to the notification information (step S20).

Next, the transmitting/receiving unit 501 transmits input information of the user as accepted by the input accepting unit 503 to the server apparatus 101 (step S21).

Subsequently, the transmitting/receiving unit 201 of the server apparatus 101 receives the input information transmitted by the information device 104 (step S22).

Next, the updating unit 205 updates the management information retained by the management information retaining unit 202 in accordance with the permission information which is included in the input information and which indicates whether or not log information of the user is to be provided (step S23).

Moreover, when collection of log information of the one electrical device (the electrical home appliance 102) is permitted based on the notification information, the transmitting/receiving unit 201 of the server apparatus 101 transmits log collection permission information that permits transmission of log information to the one electrical device. The transmitting/receiving unit 301 of the electrical home appliance 102 receives the log collection permission information transmitted by the server apparatus 101. The control unit 304 of the electrical home appliance 102 transmits collected log information based on the log collection permission information. Moreover, when the log information includes a plurality of types of log information, the log collection permission information includes information indicating whether or not transmission is permitted for each of the plurality of types of log information.

In addition, in response to the notification information, the transmitting/receiving unit 201 of the server apparatus 101 receives permission information (input information) for permitting collection of log information of the one electrical device (the electrical home appliance 102) from the information display apparatus (the information device 104) via the second network. Furthermore, based on the permission information, the transmitting/receiving unit 201 of the server apparatus 101 collects the log information of the one electrical device via the first network. Moreover, the first network and the second network may be a same network or may be networks that differ from each other.

The operation of the notification information transmitting process in step S9 in FIG. 16 and in step S17 in FIG. 17 will now be further described.

Figure 18:
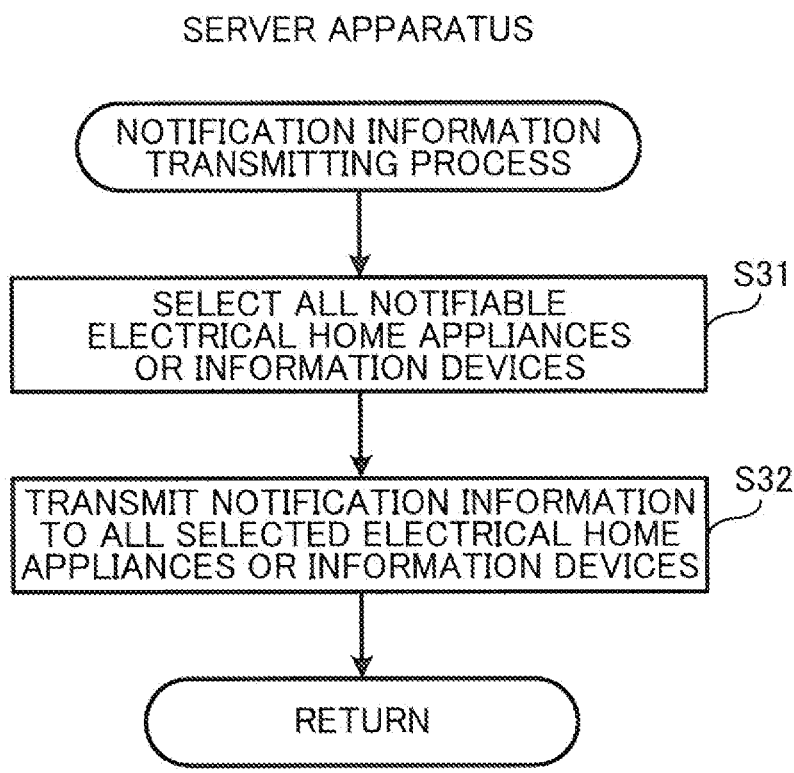
FIG. 18 is a flow chart for describing an operation of a notification information transmitting process in step S9 in FIG. 16 and in step S17 in FIG. 17.

FIG. 18 is a flow chart for describing the operation of the notification information transmitting process in step S9 in FIG. 16 and in step S17 in FIG. 17.

First, the selecting unit 206 of the server apparatus 101 selects all electrical home appliances 102 with displays (notifiable electrical home appliances 102) or information devices 104 based on the received gateway ID and the management information that is retained by the management information retaining unit 202 (step S31).

Next, the transmitting/receiving unit 201 transmits the notification information that is retained by the notification information retaining unit 203 to the electrical home appliance 102 or the information device 104 selected by the selecting unit 206 (step S32).

In this manner, the notification information may be provided to all of the plurality of information display apparatuses (the electrical home appliances 102 having displays or information devices 104).

Subsequently, another operation of the notification information transmitting process in step S9 in FIG. 16 and in step S17 in FIG. 17 will be further described.

Figure 19:
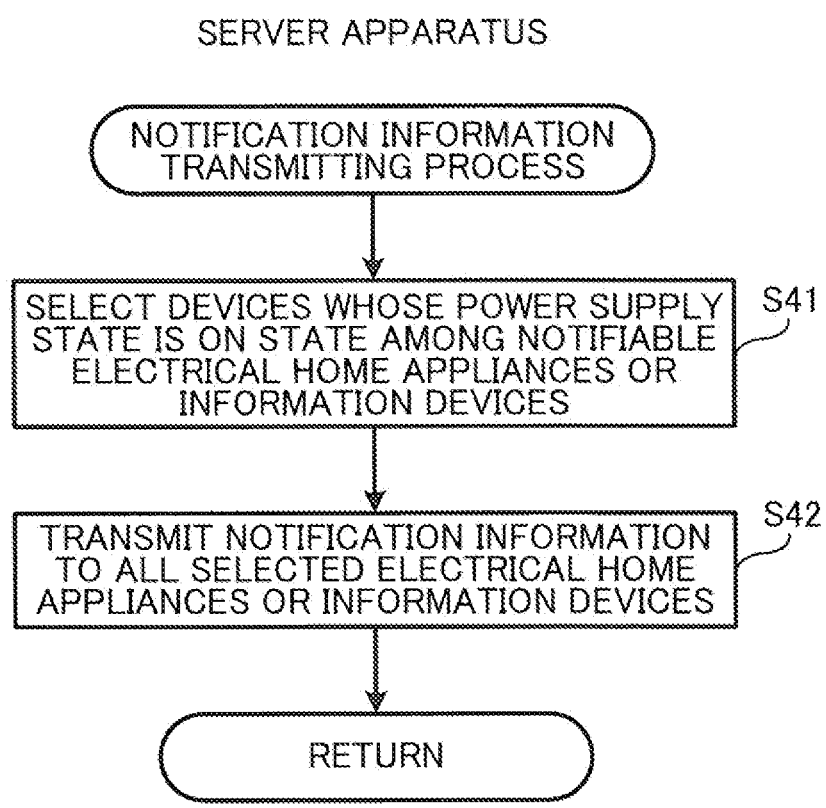
FIG. 19 is a flow chart for describing another operation of the notification information transmitting process in step S9 in FIG. 16 and in step S17 in FIG. 17.

FIG. 19 is a flow chart for describing another operation of the notification information transmitting process in step S9 in FIG. 16 and in step S17 in FIG. 17.

First, the selecting unit 206 of the server apparatus 101 selects devices whose power supply state is in an on state among electrical home appliances 102 with displays (notifiable electrical home appliances 102) or information devices 104 based on the received gateway ID and the management information that is retained by the management information retaining unit 202 (step S41).

Next, the transmitting/receiving unit 201 transmits the notification information that is retained by the notification information retaining unit 203 to the electrical home appliance 102 or the information device 104 selected by the selecting unit 206 (step S42).

In this manner, the transmitting/receiving unit 201 of the server apparatus 101 acquires a power supply state indicating whether the power supply is in an on state or an off state from a plurality of information display apparatuses (electrical home appliances 102 having displays or information devices 104) via the first network. Based on the acquired power supply state, the selecting unit 206 identifies an information display apparatus whose power supply is in an on state among the plurality of information display apparatuses. The transmitting/receiving unit 201 provides notification information to the identified information display apparatus.

Alternatively, the transmitting/receiving unit 201 of the server apparatus 101 may acquire a power supply state indicating whether the power supply is in an on state or an off state as well as an operation status indicating whether or not an operation is being performed from a plurality of information display apparatuses (electrical home appliances 102 having displays or information devices 104) via the first network. In this case, based on the acquired power supply state and operation status, the selecting unit 206 identifies an information display apparatus whose power supply is in an on state and which is being operated among the plurality of information display apparatuses. The transmitting/receiving unit 201 provides notification information to the identified information display apparatus.

Moreover, while transmission and reception of log information of the electrical home appliance 102 are not described in the first embodiment, the log information of the electrical home appliance 102 may be transmitted from the electrical home appliance 102 to the server apparatus 101 via the gateway 103. In this case, transmission and reception of log information by the electrical home appliance 102, the gateway 103, and the server apparatus 101 may be respectively performed by the transmitting/receiving unit 201, the transmitting/receiving unit 301, and the transmitting/receiving unit 401. In addition, the management information retaining unit 202 of the server apparatus 101 may retain received log information.

Second Embodiment 2.1 Configuration of Information Management System

An information management system according to a second embodiment includes a server apparatus 2101, an electrical home appliance 2201, a gateway 2301, and the information device 104 (not illustrated) in place of the server apparatus 101, the electrical home appliance 102, the gateway 103, and the information device 104 shown in FIG. 2.

Moreover, since a configuration of the information device 104 is similar to that of the first embodiment, a description thereof will be omitted.

2.2 Configuration of Server Apparatus 2101

Next, a detailed configuration of the server apparatus 2101 according to the second embodiment will be described.

Figure 20:
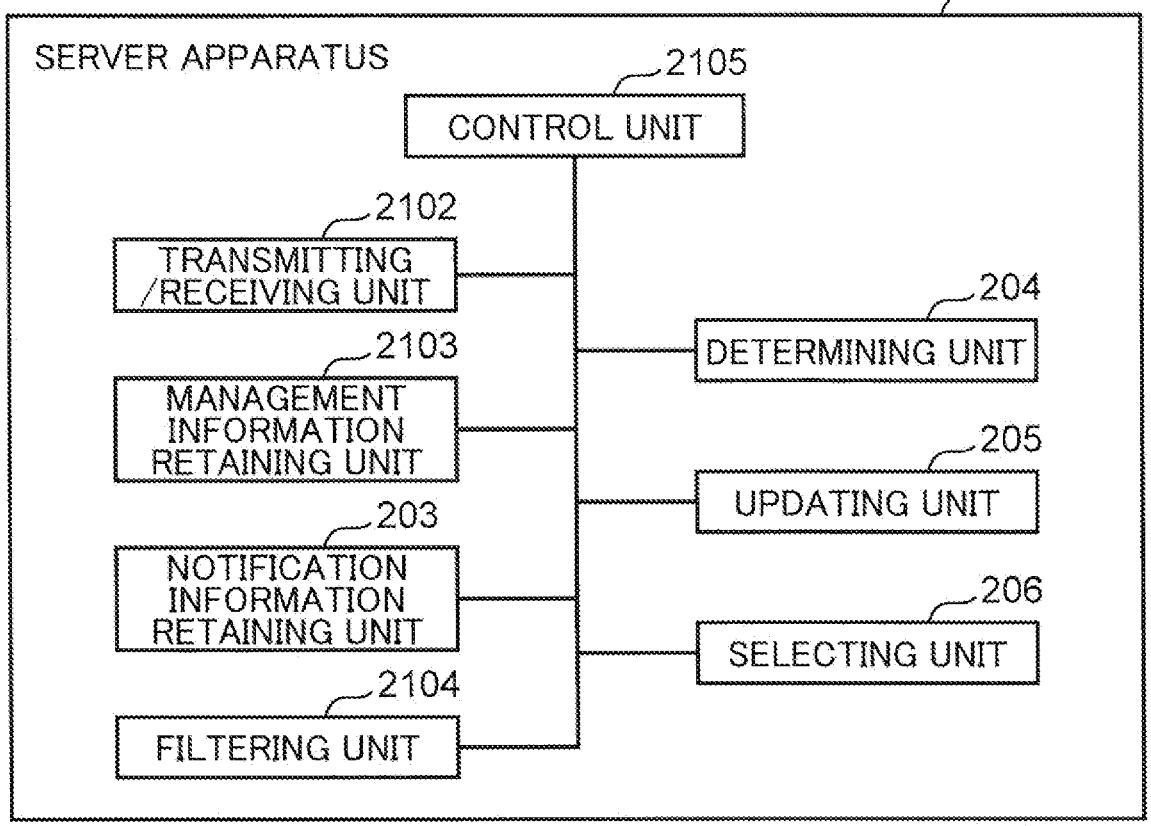
FIG. 20 is a diagram showing a configuration of a server apparatus according to a second embodiment of the present invention.

FIG. 20 is a diagram showing a configuration of a server apparatus according to the second embodiment of the present invention. As shown in FIG. 20, the server apparatus 2101 includes a notification information retaining unit 203, a determining unit 204, an updating unit 205, a selecting unit 206, a transmitting/receiving unit 2102, a management information retaining unit 2103, a filtering unit 2104, and a control unit 2105.

The server apparatus 2101 includes a microprocessor, a RAM, a ROM, a hard disk, and the like which are not specifically illustrated. The RAM, the ROM, and the hard disk store a computer program. As the microprocessor operates according to the computer program, functions of the server apparatus 2101 are realized.

Moreover, the respective functional blocks of the server apparatus 2101 including the notification information retaining unit 203, the determining unit 204, the updating unit 205, the selecting unit 206, the transmitting/receiving unit 2102, the management information retaining unit 2103, the filtering unit 2104, and the control unit 2105 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

Moreover, since configurations of the notification information retaining unit 203, the determining unit 204, the updating unit 205, and the selecting unit 206 are similar to those of the first embodiment, a description thereof will be omitted.

(1) Transmitting/Receiving Unit 2102

The transmitting/receiving unit 2102 is equipped with the functions included in the transmitting/receiving unit 201. In addition, the transmitting/receiving unit 2102 receives log information of the electrical home appliance 2201 from the gateway 2301.

(2) Management Information Retaining Unit 2103

The management information retaining unit 2103 is equipped with the functions included in the management information retaining unit 202. In addition, the management information retaining unit 2103 records and retains log information of the electrical home appliance 2201 received by the transmitting/receiving unit 2102.

(3) Filtering Unit 2104

The filtering unit 2104 selects log information to be recorded among the received log information based on a gateway ID and a device ID received by the transmitting/receiving unit 2102 and management information retained by the management information retaining unit 2103.

Figure 22:
FIG. 22 is a diagram for describing a selecting process of log information according to the second embodiment.

FIG. 22 is a diagram for describing a selecting process of log information according to the second embodiment. An upper table in FIG. 22 represents log information received by the server apparatus 2101 and a lower table in FIG. 22 represents log information that is actually recorded by the server apparatus 2101 among the received log information.

For instance, in the example shown in FIG. 9, an electrical home appliance corresponding to the device ID "896023" only permits provision of log information related to turning a power supply on/off. Therefore, for example, as shown in FIG. 22, in a case where a date/time when power had been turned on, a date/time when a program on channel 4 (4 ch) has been selected, a name of the program at the time of selection, a date/time when a program on channel 6 (6 ch) has been selected, a name of the program at the time of selection, and a date/time when power had been turned off are received from the electrical home appliance corresponding to the device ID "896023", the filtering unit 2104 only selects the date/time when power had been turned on and the date/time when power had been turned off.

In this manner, the server apparatus 2101 receives all log information that can be provided from the electrical home appliance 102 and selects and stores only log information permitted by the user from all received log information. In addition, the server apparatus 2101 discards log information other than the log information permitted by the user.

(4) Control Unit 2105

The control unit 2105 realizes functions of the server apparatus 2101 by managing and controlling the notification information retaining unit 203, the determining unit 204, the updating unit 205, the selecting unit 206, the transmitting/receiving unit 2102, the management information retaining unit 2103, and the filtering unit 2104 described above.

2.3 Configuration of Electrical Home Appliance 2201

Next, a detailed configuration of the electrical home appliance 2201 according to the second embodiment will be described.

Figure 21:
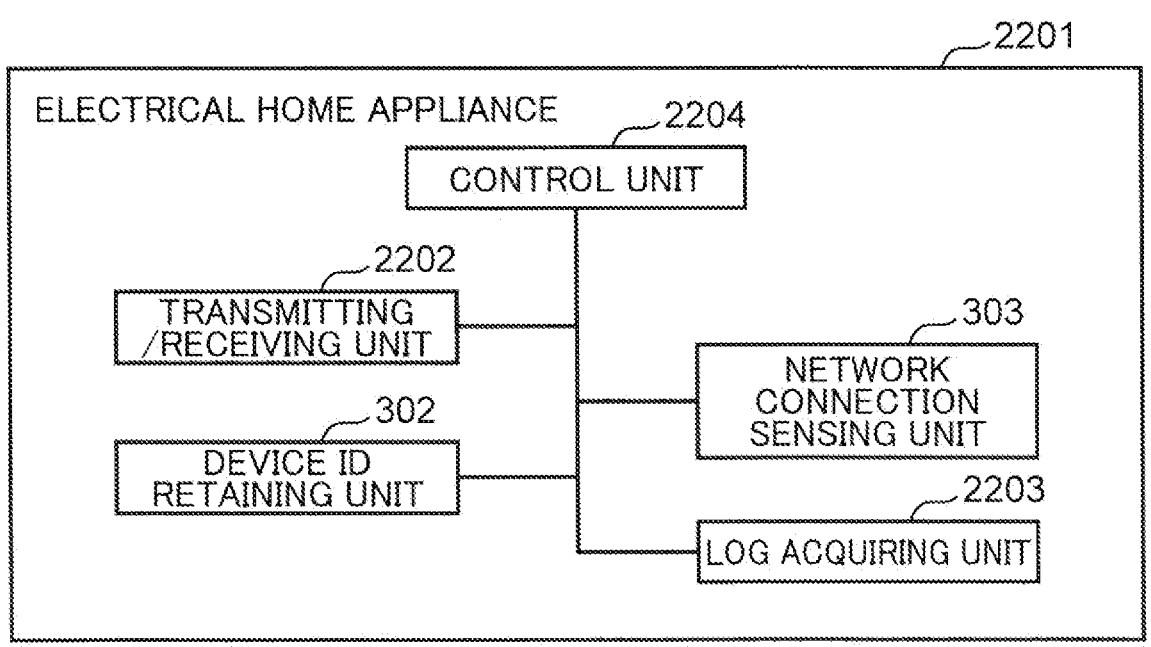
FIG. 21 is a diagram showing a configuration of an electrical home appliance according to the second embodiment of the present invention.

FIG. 21 is a diagram showing a configuration of an electrical home appliance according to the second embodiment of the present invention. As shown in FIG. 21, the electrical home appliance 2201 includes a device ID retaining unit 302, a network connection sensing unit 303, a transmitting/receiving unit 2202, a log acquiring unit 2203, and a control unit 2204.

The electrical home appliance 2201 includes a microprocessor, a RAM, a ROM, a hard disk, and the like which are not specifically illustrated. The RAM, the ROM, and the hard disk store a computer program. As the microprocessor operates according to the computer program, functions of the electrical home appliance 2201 are realized.

Moreover, the respective functional blocks of the device ID retaining unit 302, the network connection sensing unit 303, the transmitting/receiving unit 2202, the log acquiring unit 2203, and the control unit 2204 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

Moreover, since configurations of the device ID retaining unit 302 and the network connection sensing unit 303 are similar to those of the first embodiment, a description thereof will be omitted.

(1) Transmitting/Receiving Unit 2202

The transmitting/receiving unit 2202 is equipped with the functions included in the transmitting/receiving unit 301. In addition, the transmitting/receiving unit 2202 transmits log information of the electrical home appliance 2201 to the gateway 2301.

(2) Log Acquiring Unit 2203

The log acquiring unit 2203 acquires all log information of the electrical home appliance 2201. In this case, for example, when the electrical home appliance is a television set, the log information includes a date/time when power had been turned on, a number of a selected channel, a name of a viewed program, a date/time when power had been turned off, a site name of a viewed website on the Internet, a URL of the website, and a date/time when the website had been viewed.

(3) Control Unit 2204

The control unit 2204 realizes functions of the electrical home appliance 2201 by managing and controlling the device ID retaining unit 302, the network connection sensing unit 303, the transmitting/receiving unit 2202, and the log acquiring unit 2203 described above.

2.4 Configuration of Gateway 2301

Next, a configuration of the gateway 2301 according to the second embodiment will be described by focusing only on differences from the gateway 103 according to the first embodiment. A transmitting/receiving unit of the gateway 2301 is equipped with functions included in the transmitting/receiving unit 401 of the gateway 103. In addition, the transmitting/receiving unit receives log information of the electrical home appliance 2201 that is transmitted by the electrical home appliance 2201.

Furthermore, the transmitting/receiving unit of the gateway 2301 is also equipped with a function for transmitting log information received from the electrical home appliance 2201 to the server apparatus 2101.

2.5 Operation of Information Management System

An example of an operation in which the electrical home appliance 2201 acquires log information and the server apparatus 2101 retains the acquired log information will now be described with reference to FIG. 23.

Figure 23:
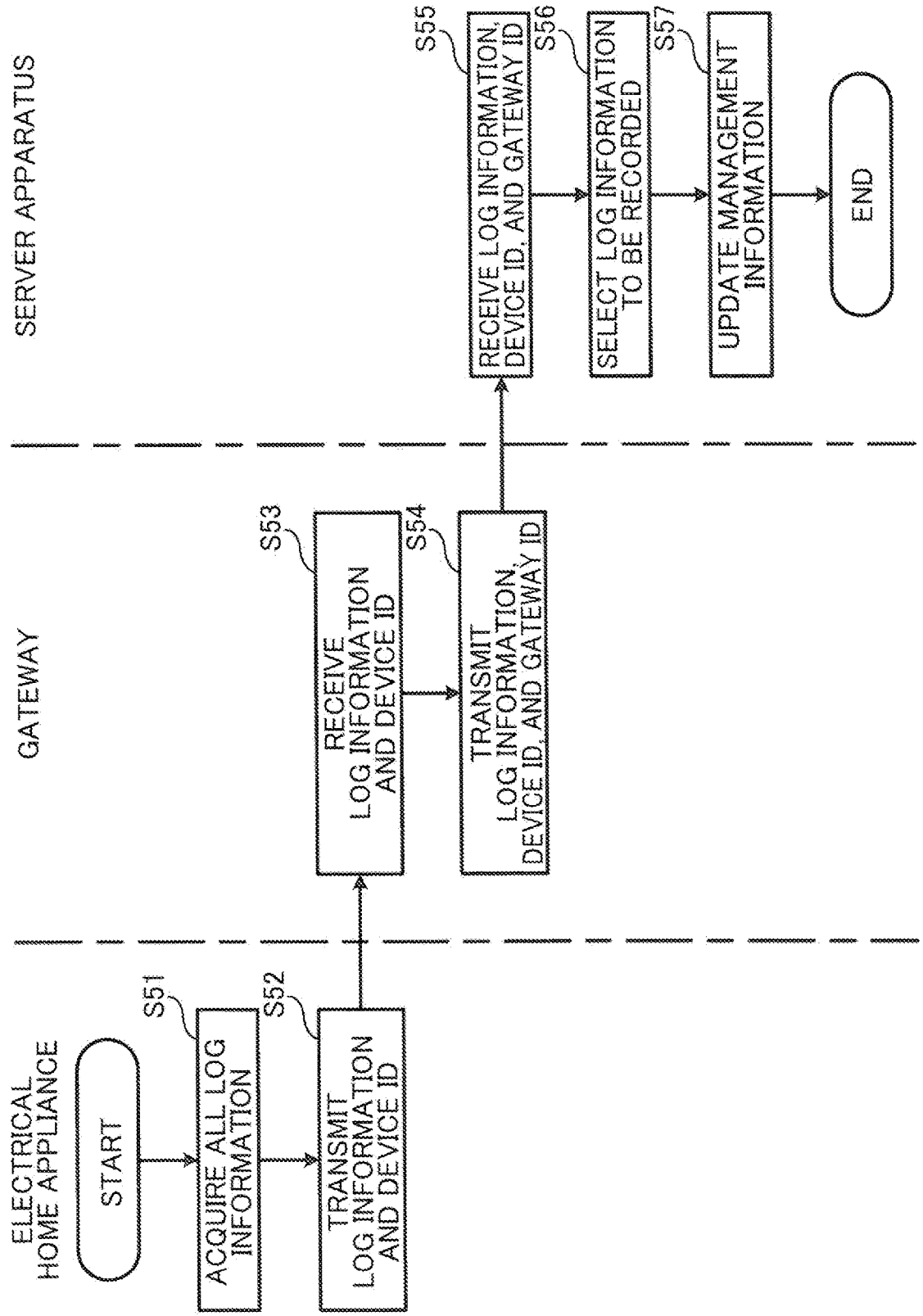
FIG. 23 is a flow chart for describing an operation by an information management system according to the second embodiment of the present invention.

FIG. 23 is a flow chart for describing an operation by the information management system according to the second embodiment of the present invention.

First, the log acquiring unit 2203 of the electrical home appliance 2201 acquires all log information of the electrical home appliance 2201 (step S51).

Next, the transmitting/receiving unit 2202 transmits the log information acquired by the log acquiring unit 2203 and the device ID retained by the device ID retaining unit 302 to the gateway 2301 (step S52).

The transmitting/receiving unit 401 of the gateway 2301 receives the log information and the device ID transmitted by the electrical home appliance 2201 (step S53).

Subsequently, the transmitting/receiving unit 401 transmits the received log information and device ID and the gateway ID retained by the gateway ID retaining unit 402 to the server apparatus 2101 (step S54).

Next, the transmitting/receiving unit 2102 of the server apparatus 2101 receives the log information, the device ID, and the gateway ID transmitted by the gateway 2301 (step S55).

The filtering unit 2104 then selects log information to be recorded among the received log information based on the log information, the device ID, and the gateway ID received by the transmitting/receiving unit 2102 and management information retained by the management information retaining unit 2103 (step S56).

Next, the updating unit 205 stores the log information selected by the filtering unit 2104 in the management information retaining unit 2103 and updates the management information (a recording log) retained by the management information retaining unit 2103 (step S57).

The management information (the recording log) that is retained by the management information retaining unit 2103 will now be described with reference to FIG. 22. The example in FIG. 22 shows that log information is managed per device ID and that a power supply of the electrical home appliance corresponding to the device ID "896023" had been turned on at 13:00 on Apr. 4, 2013 and turned off at 14:40 on Apr. 4, 2013. In addition, the example in FIG. 22 shows that the filtering unit 2104 has selected log information to be recorded among the received log information, the log information related to a channel number and a program name is not recorded, and only log information related to a power supply state is recorded.

As shown, the server apparatus acquires all log information from the electrical home appliance and stores only log information for which collection is permitted among the acquired log information. Therefore, since log information for which collection is permitted need not be selected by the electrical home appliance, there is no longer a need to perform special settings on the electrical home appliance and a configuration of the electrical home appliance can be simplified.

Third Embodiment 3.1 Configuration of Information Management System

An information management system according to a third embodiment includes the server apparatus 101, an electrical home appliance 2501, a gateway 2301, and the information device 104 (not illustrated) in place of the server apparatus 101, the electrical home appliance 102, the gateway 103, and the information device 104 shown in FIG. 2.

Moreover, since configurations of the server apparatus 101 and the information device 104 are similar to those of the first embodiment and a configuration of the gateway 2301 is similar to that of the second embodiment, a description thereof will be omitted.

3.2 Configuration of Electrical Home Appliance 2501

Next, a detailed configuration of the electrical home appliance 2501 according to the third embodiment will be described.

Figure 24:
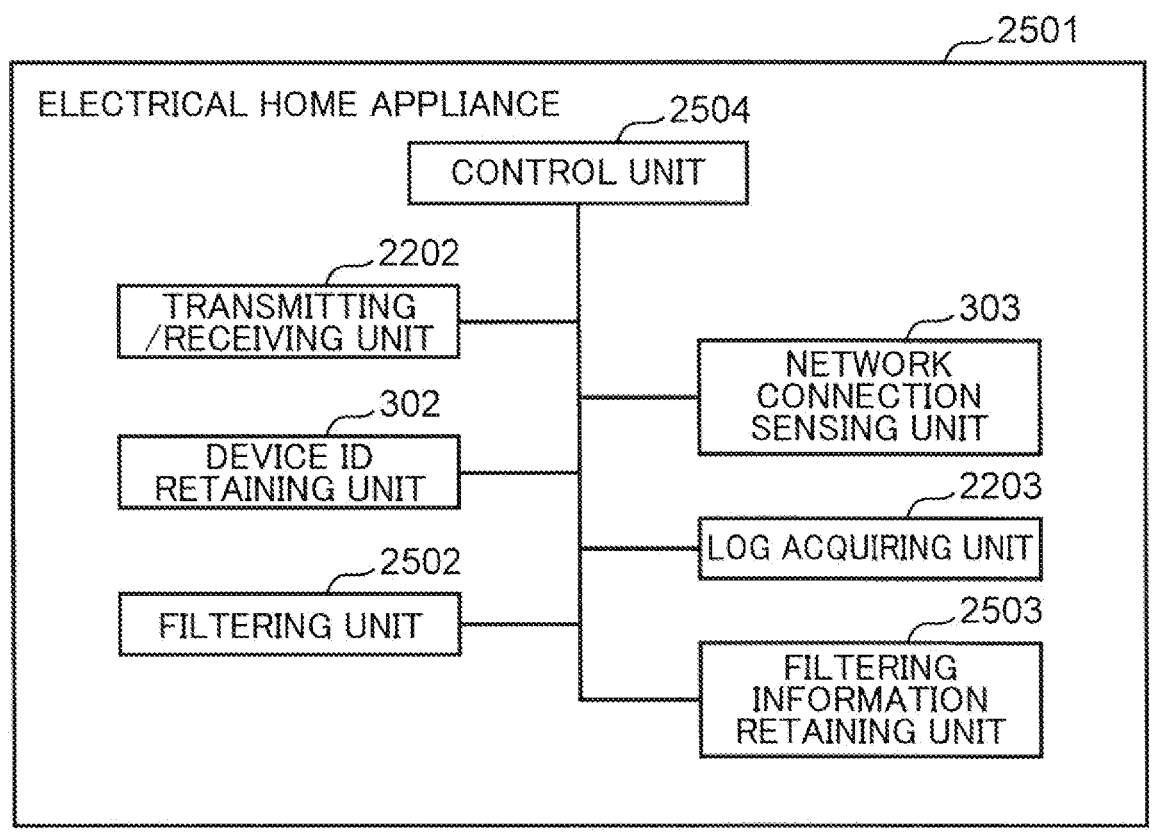
FIG. 24 is a diagram showing a configuration of an electrical home appliance according to a third embodiment of the present invention.

FIG. 24 is a diagram showing a configuration of an electrical home appliance according to the third embodiment of the present invention. As shown in FIG. 24, the electrical home appliance 2501 includes a device ID retaining unit 302, a network connection sensing unit 303, a transmitting/receiving unit 2202, a log acquiring unit 2203, a filtering unit 2502, a filtering information retaining unit 2503, and a control unit 2504.

The electrical home appliance 2501 includes a microprocessor, a RAM, a ROM, a hard disk, and the like which are not specifically illustrated. The RAM, the ROM, and the hard disk store a computer program. As the microprocessor operates according to the computer program, functions of the electrical home appliance 2501 are realized.

Moreover, the respective functional blocks of the device ID retaining unit 302, the network connection sensing unit 303, the transmitting/receiving unit 2202, the log acquiring unit 2203, the filtering unit 2502, the filtering information retaining unit 2503, and the control unit 2504 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

Moreover, since configurations of the device ID retaining unit 302 and the network connection sensing unit 303 are similar to those of the first embodiment and configurations of the transmitting/receiving unit 2202 and the log acquiring unit 2203 are similar to those of the second embodiment, a description thereof will be omitted.

(1) Filtering Unit 2502

The filtering unit 2502 selects log information to be transmitted to the gateway 2301 based on the log information acquired by the log acquiring unit 2203 and filtering information retained by the filtering information retaining unit 2503.

(2) Filtering Information Retaining Unit 2503

The filtering information retaining unit 2503 retains and manages filtering information indicating a provision status of log information of the electrical home appliance.

FIG. 25 is a diagram showing an example of filtering information according to the third embodiment. The example in FIG. 25 shows that the device ID of the electrical home appliance is "896023" and that only provision of log information related to a power supply state is permitted. In this manner, the filtering information retaining unit 2503 stores filtering information that associates a device ID and a provision status of log information of an electrical home appliance corresponding to the device ID with each other.

(3) Control Unit 2504

The control unit 2504 realizes functions of the electrical home appliance 2501 by managing and controlling the device ID retaining unit 302, the network connection sensing unit 303, the transmitting/receiving unit 2202, the log acquiring unit 2203, the filtering unit 2502, the filtering information retaining unit 2503, and the control unit 2504 described above.

3.3 Operation of Information Management System

An example of an operation in which the electrical home appliance 2501 acquires log information and the server apparatus 101 retains the acquired log information will now be described with reference to FIG. 26.

Figure 26:
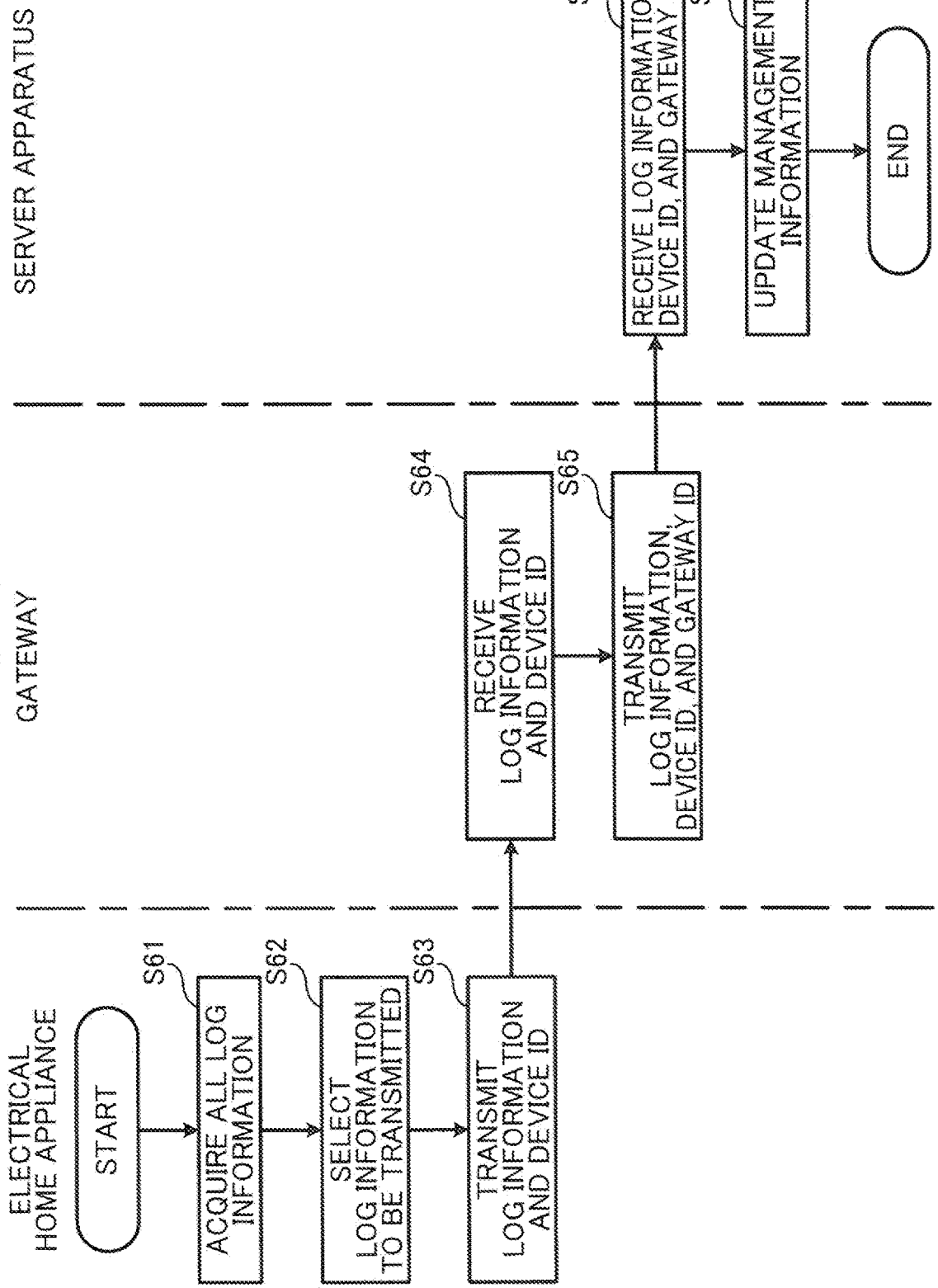
FIG. 26 is a flow chart for describing an operation by an information management system according to the third embodiment of the present invention.

FIG. 26 is a flow chart for describing an operation by the information management system according to the third embodiment of the present invention.

First, the log acquiring unit 2203 of the electrical home appliance 2501 acquires all log information of the electrical home appliance 2501 (step S61).

The filtering unit 2502 selects log information to be transmitted to the gateway 2301 among the acquired log information based on the log information acquired by the log acquiring unit 2203 and filtering information retained by the filtering information retaining unit 2503 (step S62).

Next, the transmitting/receiving unit 2202 transmits the log information selected by the filtering unit 2502 and the device ID retained by the device ID retaining unit 302 to the gateway 2301 (step S63).

The transmitting/receiving unit 401 of the gateway 2301 receives the log information and the device ID transmitted by the electrical home appliance 2501 (step S64).

Subsequently, the transmitting/receiving unit 401 transmits the received log information and device ID and the gateway ID retained by the gateway ID retaining unit 402 to the server apparatus 101 (step S65).

The transmitting/receiving unit 201 of the server apparatus 101 receives the log information, the device ID, and the gateway ID transmitted by the gateway 2301 (step S66).

Next, the updating unit 205 stores the log information in the management information retaining unit 202 based on the log information, the device ID, and the gateway ID received by the transmitting/receiving unit 201 and updates the management information (the recording log) that is retained by the management information retaining unit 202 (step S67).

As shown, in response to the notification information, the transmitting/receiving unit 201 of the server apparatus 101 receives permission information for permitting collection of log information of the one electrical device (the electrical home appliance 2501) from the information display apparatus (the information device 104) via the second network. In addition, based on the permission information, the transmitting/receiving unit 201 of the server apparatus 101 transmits setting information for setting whether or not the log information of the one electrical device (the electrical home appliance 2501) is to be collected to the one electrical device (the electrical home appliance 2501) via the first network. The transmitting/receiving unit 2202 of the electrical home appliance 2501 receives the setting information transmitted by the server apparatus 101 and updates filtering information in accordance with the received setting information. The transmitting/receiving unit 201 of the server apparatus 101 receives the log information of the one electrical device that is transmitted by the one electrical device based on the setting content via the first network.

The management information (the recording log) that is retained by the management information retaining unit 202 will now be described with reference to FIG. 27.

Figure 27:
FIG. 27 is a diagram for describing an updating process of log information according to the third embodiment.

FIG. 27 is a diagram for describing an updating process of log information according to the third embodiment. An upper table in FIG. 27 represents log information received by the server apparatus 101 and a lower table in FIG. 27 represents log information that is actually stored by the server apparatus 101 among the received log information.

The example in FIG. 27 shows that log information is managed per device ID and that a power supply of the electrical home appliance corresponding to the device ID "896023" had been turned on at 13:00 on Apr. 4, 2013 and turned off at 14:40 on Apr. 4, 2013. In addition, the example in FIG. 27 also shows that log information to be recorded is not selected and all received log information is to be recorded as a recording log by the server apparatus 101.

In this manner, the electrical home appliance selects only log information of which collection is permitted from all acquired log information and transmits the selected log information to the server apparatus. Therefore, since the log information of which collection is permitted is selected by the electrical home appliance, an amount of log information that is transmitted from the electrical home appliance to the server apparatus can be reduced and a configuration of the server apparatus can be simplified.

Moreover, while the server apparatus includes a filtering unit according to the second embodiment and the electrical home appliance includes a filtering unit according to the third embodiment, the present invention is not limited thereto and the gateway may include a filtering unit.

In this case, in response to notification information, the transmitting/receiving unit 201 of the server apparatus 101 receives permission information for permitting collection of log information of the one electrical device (the electrical home appliance 102) from the information display apparatus (the information device 104) via the second network. In addition, based on the permission information, the transmitting/receiving unit 201 of the server apparatus 101 transmits setting information for setting whether or not the log information of the one electrical device (the electrical home appliance 102) is to be collected to the gateway 103 via the first network. The transmitting/receiving unit 401 of the gateway 103 receives the setting information transmitted by the server apparatus 101 and updates filtering information in accordance with the received setting information.

The transmitting/receiving unit 301 of the electrical home appliance 102 transmits all log information of the electrical home appliance 2501 to the gateway 103. The filtering unit of the gateway 103 selects log information to be transmitted to the server apparatus 101 among the received log information based on the received log information and the retained filtering information. The transmitting/receiving unit 201 of the server apparatus 101 receives the log information of the one electrical device that is transmitted by the gateway 103 based on the setting content via the first network.

Fourth Embodiment 4.1 Configuration of Information Management System

An information management system according to a fourth embodiment includes the server apparatus 101, the electrical home appliance 102, a gateway 2901, and the information device 104 (not illustrated) in place of the server apparatus 101, the electrical home appliance 102, the gateway 103, and the information device 104 shown in FIG. 2.

Moreover, since configurations of the server apparatus 101, the electrical home appliance 102, and the information device 104 are similar to those of the first embodiment, a description thereof will be omitted.

4.2 Configuration of Gateway 2901

Next, a detailed configuration of the gateway 2901 according to the fourth embodiment will be described.

Figures 28, 29:
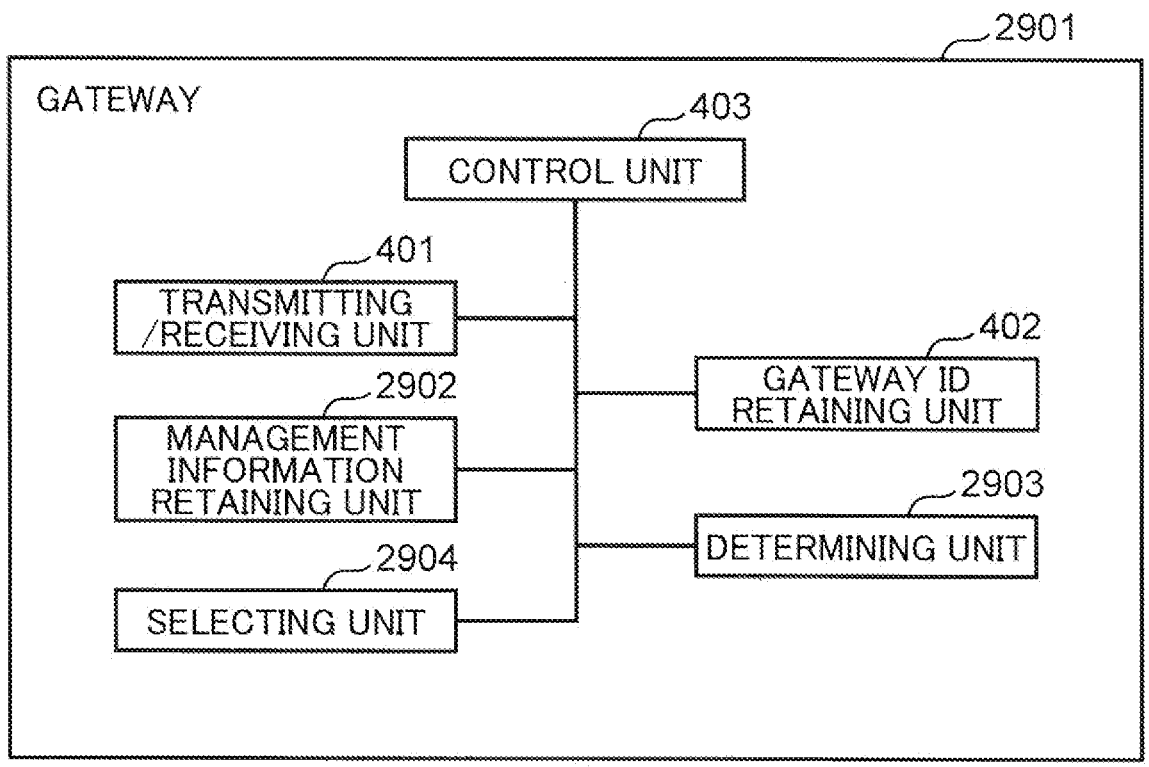
FIG. 28 is a diagram showing a configuration of a gateway according to a fourth embodiment of the present invention.
FIG. 29 is a diagram showing an example of management information according to the fourth embodiment.

FIG. 28 is a diagram showing a configuration of a gateway according to the fourth embodiment of the present invention. As shown in FIG. 28, the gateway 2901 includes a transmitting/receiving unit 401, a gateway ID retaining unit 402, a management information retaining unit 2902, a determining unit 2903, a selecting unit 2904, and a control unit 2905.

The gateway 2901 includes a microprocessor, a RAM, a ROM, a hard disk, and the like which are not specifically illustrated. The RAM, the ROM, and the hard disk store a computer program. As the microprocessor operates according to the computer program, functions of the gateway 2901 are realized.

Moreover, the respective functional blocks of the transmitting/receiving unit 401, the gateway ID retaining unit 402, the management information retaining unit 2902, the determining unit 2903, the selecting unit 2904, and the control unit 2905 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

Moreover, since configurations of the transmitting/receiving unit 401 and the gateway ID retaining unit 402 are similar to those of the first embodiment, a description thereof will be omitted.

(1) Management Information Retaining Unit 2902

The management information retaining unit 2902 retains and manages management information such as a device ID of the electrical home appliance 102, whether or not the electrical home appliance 102 has a display, whether or not the electrical home appliance 102 is providing log information, and whether or not the current power supply state of the electrical home appliance 102 is an on state.

FIG. 29 is a diagram showing an example of management information according to the fourth embodiment. In the example shown in FIG. 29, an electrical home appliance corresponding to a device ID "123456" (hereinafter referred to as an electrical home appliance A) and an electrical home appliance corresponding to a device ID "896023" (hereinafter referred to as an electrical home appliance B) are connected. It is shown that the electrical home appliance A does not have a display, provides log information (has permitted provision of log information), and a current power supply state is an on state. It is also shown that the electrical home appliance B has a display, provides log information (has permitted provision of log information), and a current power supply state is an on state.

(2) Determining Unit 2903

The determining unit 2903 determines whether or not there is an electrical home appliance having a display or an information device among the electrical home appliances and information devices connected to the gateway 2901 based on management information retained by the management information retaining unit 2902.

(3) Selecting Unit 2904

When the determining unit 2903 determines that there is an electrical home appliance having a display or an information device, the selecting unit 2904 selects all electrical home appliances having a display and information devices based on the management information retained by the management information retaining unit 2902.

Alternatively, when the determining unit 2903 determines that there is an electrical home appliance having a display or an information device, the selecting unit 2904 may select all electrical home appliances and information devices whose current power supply state is an on state among the electrical home appliances having a display and information devices based on the management information retained by the management information retaining unit 2902.

(4) Control Unit 2905

The control unit 2905 realizes functions of the gateway 2901 by managing and controlling the transmitting/receiving unit 401, the gateway ID retaining unit 402, the management information retaining unit 2902, the determining unit 2903, the selecting unit 2904, and the control unit 2905 described above.

4.3 Operation of Information Management System

An example of an operation for confirming connection of the electrical home appliance 102 to the network and whether log information of the electrical home appliance 102 is to be provided will now be described with reference to FIGS. 30 to 33.

Figure 30:
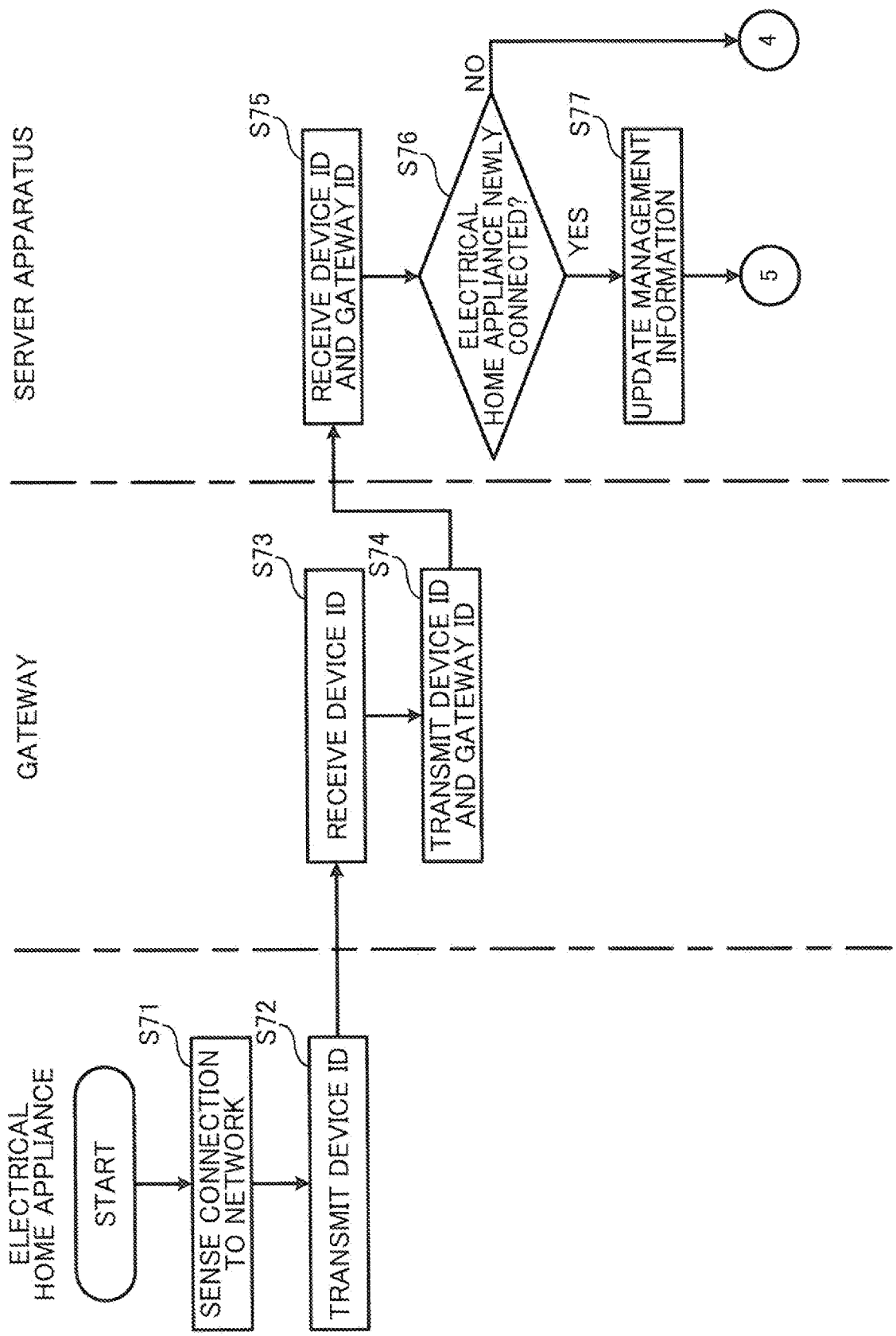
FIG. 30 is a first flow chart for describing an operation by an information management system according to the fourth embodiment of the present invention.
Figure 31:
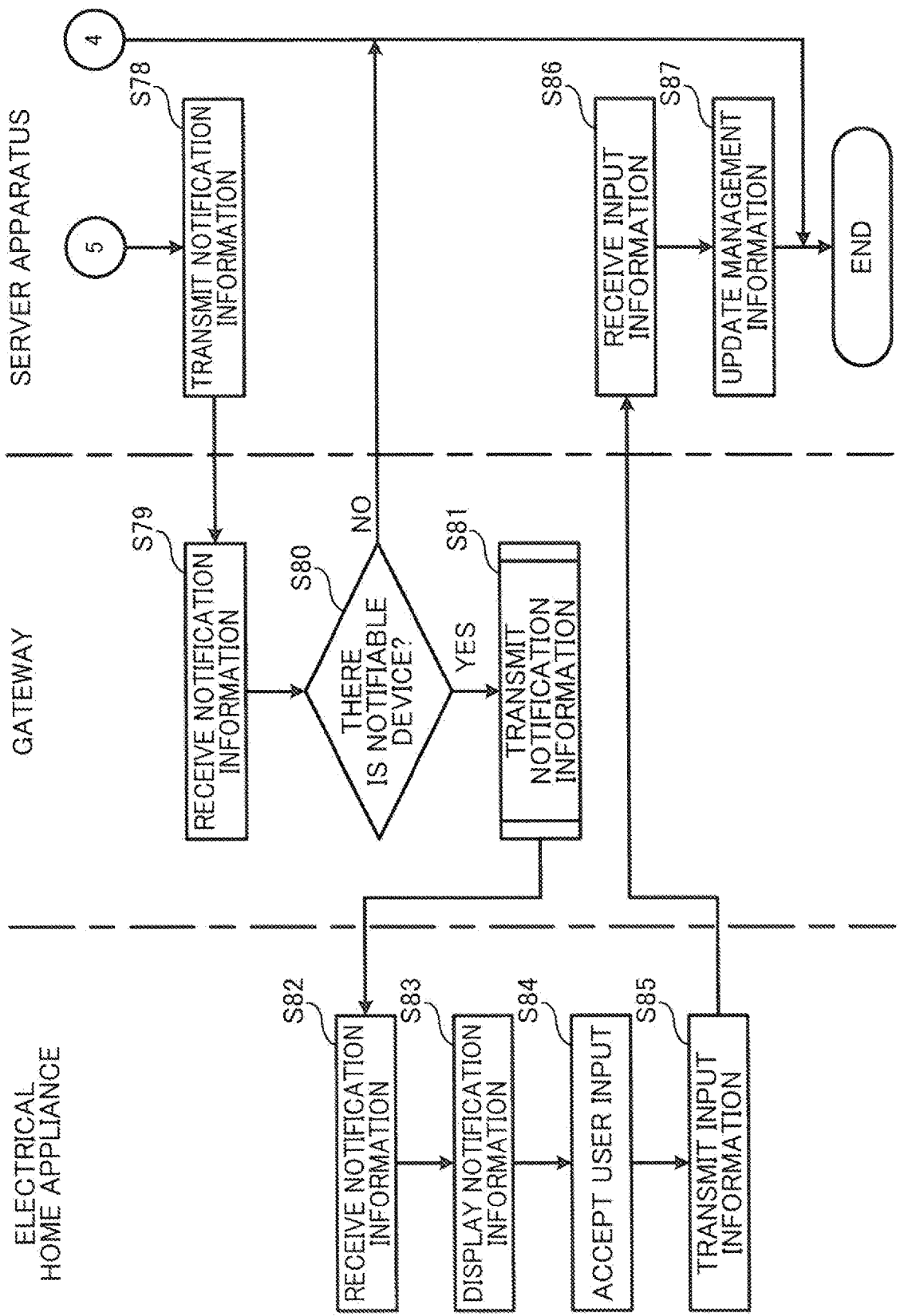
FIG. 31 is a second flow chart for describing an operation by the information management system according to the fourth embodiment of the present invention.

FIG. 30 is a first flow chart for describing an operation by the information management system according to the fourth embodiment of the present invention, and FIG. 31 is a second flow chart for describing an operation by the information management system according to the fourth embodiment of the present invention.

Since the operation of steps S71 to S77 in FIG. 30 is similar to the operation of steps S1 to S7 in FIG. 15, a description thereof will be omitted. Operations of steps S78 and thereafter in FIG. 31 will be described below.

The transmitting/receiving unit 201 of the server apparatus 101 transmits notification information retained by the notification information retaining unit 203 to the gateway 2901 (step S78).

The transmitting/receiving unit 401 of the gateway 2901 receives the notification information transmitted by the server apparatus 101 (step S79).

Next, based on the management information retained by the management information retaining unit 2902, the determining unit 2903 determines whether or not there is a notifiable device or, in other words, whether or not there is an electrical home appliance 102 having a display or an information device 104 (step S80). At this point, when it is determined that there is no electrical home appliance 102 having a display or information device 104 (NO in step S80), the process is terminated.

On the other hand, when it is determined that there is an electrical home appliance 102 having a display or an information device 104 (YES in step S80), the transmitting/receiving unit 401 transmits the notification information received from the server apparatus 101 to the electrical home appliance 102 having a display or the information device 104 (step S81). Moreover, in this case, the transmitting/receiving unit 401 transmits the notification information to the information device 104.

Next, the transmitting/receiving unit 501 of the information device 104 receives the notification information transmitted by the gateway 2901 (step S82).

Subsequently, the display unit 502 displays the received notification information (step S83).

The input accepting unit 503 then accepts an input (a response) by the user with respect to the notification information (step S84).

Next, the transmitting/receiving unit 501 transmits input information of the user as accepted by the input accepting unit 503 to the server apparatus 101 (step S85).

Subsequently, the transmitting/receiving unit 201 of the server apparatus receives the input information transmitted by the information device 104 (step S86).

Next, the updating unit 205 updates the management information retained by the management information retaining unit 202 in accordance with the permission information which is included in the input information and which indicates whether or not log information of the user is to be provided (step S87).

An operation of the notification information transmitting process in step S81 in FIG. 31 will now be further described.

Figure 32:
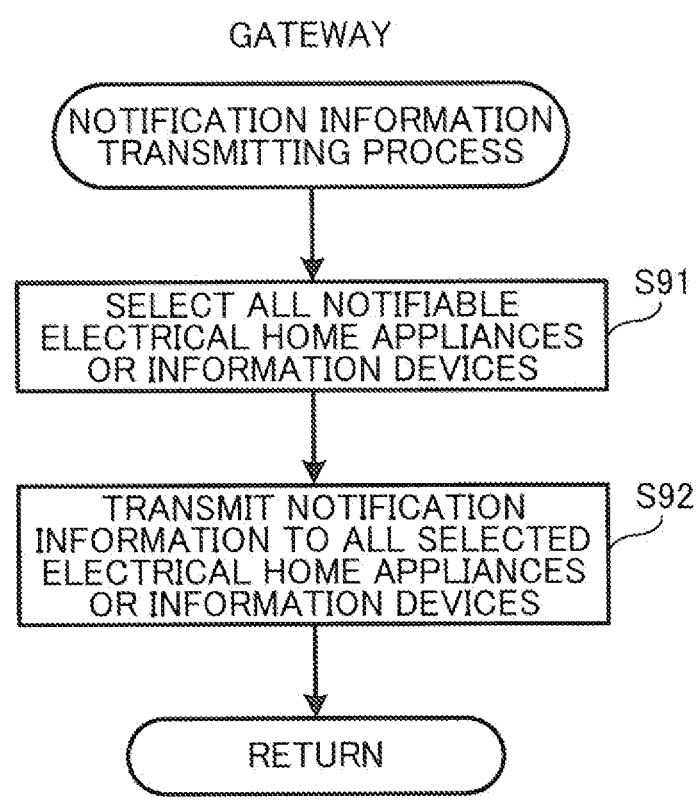
FIG. 32 is a flow chart for describing an operation of a notification information transmitting process in step S81 in FIG. 31.

FIG. 32 is a flow chart for describing the operation of the notification information transmitting process in step S81 in FIG. 31.

First, the selecting unit 2904 of the gateway 2901 selects all electrical home appliances 102 with displays (notifiable electrical home appliances 102) or information devices 104 based on the management information that is retained by the management information retaining unit 2902 (step S91).

Next, the transmitting/receiving unit 401 transmits the notification information received from the server apparatus 101 to the electrical home appliance 102 or the information device 104 selected by the selecting unit 2904 (step S92).

Another operation of the notification information transmitting process in step S81 in FIG. 31 will now be further described.

Figure 33:
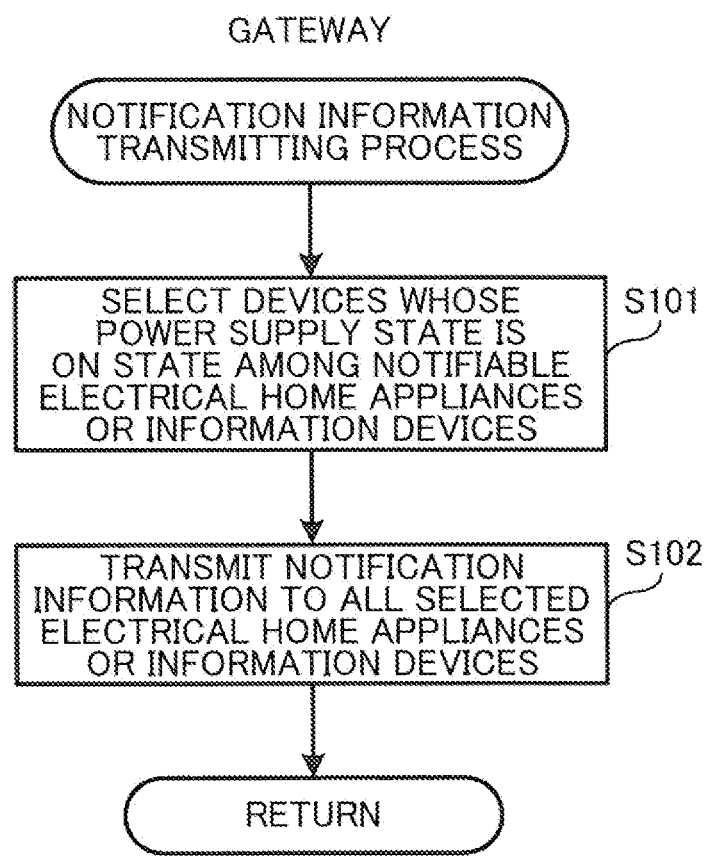
FIG. 33 is a flow chart for describing another operation of the notification information transmitting process in step S81 in FIG. 31.

FIG. 33 is a flow chart for describing another operation of the notification information transmitting process in step S81 in FIG. 31.

First, the selecting unit 2904 of the gateway 2901 selects devices whose power supply state is an on state among electrical home appliances 102 with displays or information devices 104 based on the management information that is retained by the management information retaining unit 2902 (step S101).

Next, the transmitting/receiving unit 401 transmits the notification information received from the server apparatus 101 to the electrical home appliance 102 or the information device 104 selected by the selecting unit 2904 (step S102).

In this manner, the transmitting/receiving unit 201 of the server apparatus 101 receives, via the first network, a device ID indicating one electrical device and an attribute ID indicating that the one electrical device belongs to a same owner, a same group, or a same home as the one or more electrical devices from the gateway 103 connected to the one electrical device. In addition, when it is determined that the one electrical device is a newly connected electrical device, the transmitting/receiving unit 201 transmits notification information to the gateway 103 via the second network. Furthermore, based on the device ID indicating an information display apparatus, the transmitting/receiving unit 401 of the gateway 2901 provides notification information to the information display apparatus via the gateway 103, the device ID is managed by the gateway 103.

Fifth Embodiment 5.1 Configuration of Information Management System

Figure 34:
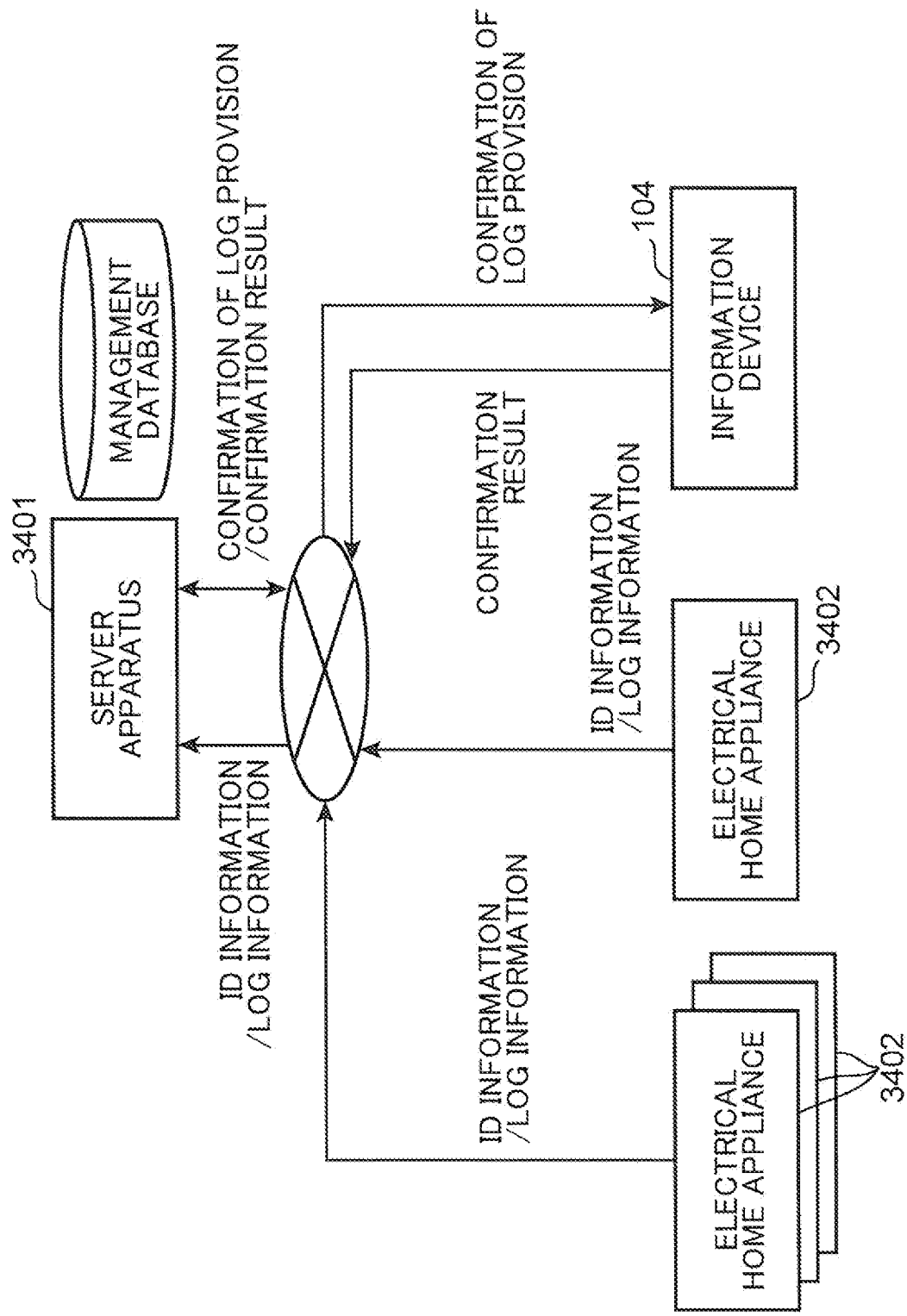
FIG. 34 is a diagram showing a configuration of an information management system according to a fifth embodiment of the present invention.

FIG. 34 is a diagram showing a configuration of an information management system according to a fifth embodiment of the present invention. As shown in FIG. 34, the information management system includes a server apparatus 3401, an electrical home appliance 3402, and an information device 104.

In FIG. 34, the electrical home appliance 3402 and the information device 104 are positioned in the home. The electrical home appliance 3402 and the information device 104 are respectively connected to the server apparatus 3401 via the network.

The electrical home appliance 3402 is, for example, an air conditioner, an AV device such as a television set, a washing machine, an illumination device, an electronic shutter, an intercom, or the like.

The electrical home appliance 3402 is connected to the server apparatus 3401. The electrical home appliance 3402 transmits ID information (a device ID) that enables each electrical home appliance 3402 to be uniquely identified or log information to the server apparatus 3401.

In addition, when a new electrical home appliance 3402 is connected to the network, the server apparatus 3401 presents a message confirming whether or not provision (transmission) of log information of the new electrical home appliance 3402 is to be permitted to the information device 104 owned by the user of the new electrical home appliance 3402 and receives a confirmation result by the user. When the provision of log information is permitted, the new electrical home appliance 3402 provides ID information and log information to the server apparatus 3401. The server apparatus 3401 stores and manages the log information using a managed database (a management database).

Moreover, since a configuration of the information device 104 is similar to that of the first embodiment, a description thereof will be omitted.

5.2 Configuration of Server Apparatus 3401

Next, a detailed configuration of the server apparatus 3401 according to the fifth embodiment will be described.

Figure 35:
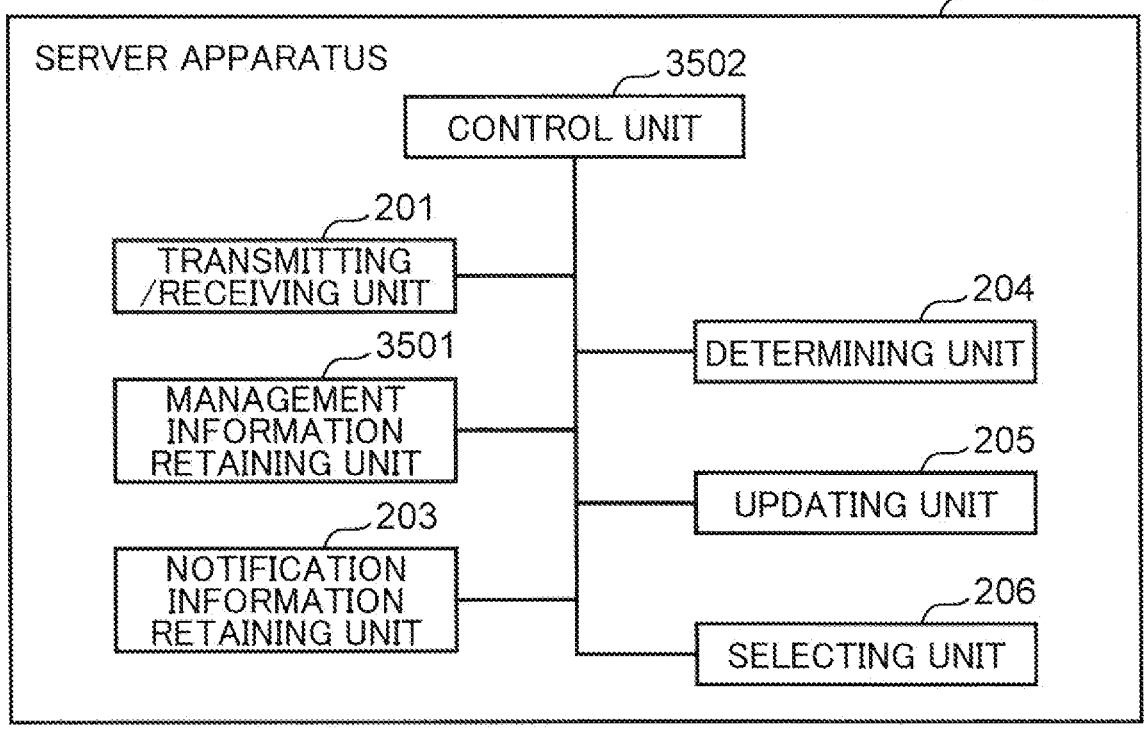
FIG. 35 is a diagram showing a configuration of a server apparatus according to the fifth embodiment of the present invention.

FIG. 35 is a diagram showing a configuration of a server apparatus according to the fifth embodiment of the present invention. As shown in FIG. 35, the server apparatus 3401 includes a transmitting/receiving unit 201, a management information retaining unit 3501, a notification information retaining unit 203, a determining unit 204, an updating unit 205, a selecting unit 206, and a control unit 3502.

The server apparatus 3401 includes a microprocessor, a RAM, a ROM, a hard disk, and the like which are not specifically illustrated. The RAM, the ROM, and the hard disk store a computer program. As the microprocessor operates according to the computer program, functions of the server apparatus 3401 are realized.

Moreover, the respective functional blocks of the server apparatus 3401 including the transmitting/receiving unit 201, the management information retaining unit 3501, the notification information retaining unit 203, the determining unit 204, the updating unit 205, the selecting unit 206, and the control unit 3502 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

Moreover, since configurations of the transmitting/receiving unit 201, the notification information retaining unit 203, the determining unit 204, the updating unit 205, and the selecting unit 206 are similar to those of the first embodiment, a description thereof will be omitted.

(1) Management Information Retaining Unit 3501

The management information retaining unit 3501 retains and manages management information such as an association between an attribute ID for identifying a group to which the electrical home appliance 3402 belongs and a device ID of the electrical home appliance 3402, whether or not the electrical home appliance 3402 has a display, whether or not the electrical home appliance 3402 is providing log information, and whether or not the current power supply state of the electrical home appliance 3402 is an on state.

FIG. 37 is a diagram showing an example of management information according to the fifth embodiment. In the example shown in FIG. 37, an electrical home appliance corresponding to a device ID "123456" (hereinafter referred to as an electrical home appliance A) and an electrical home appliance corresponding to a device ID "896023" (hereinafter referred to as an electrical home appliance B) belong to a group represented by an attribute ID "32456389". It is shown that the electrical home appliance A does not have a display, provides log information (has permitted provision of log information), and a current power supply state is an on state. It is also shown that the electrical home appliance B has a display, provides log information (has permitted provision of log information), and a current power supply state is an on state.

Moreover, since a provision status of the address information and the log information retained by the management information retaining unit 3501 is similar to that of the management information retaining unit 202 according to the first embodiment, a description thereof will be omitted.

(2) Control Unit 3502

The control unit 3502 realizes functions of the server apparatus 3401 by managing and controlling the transmitting/receiving unit 201, the management information retaining unit 3501, the notification information retaining unit 203, the determining unit 204, the updating unit 205, the selecting unit 206, and the control unit 3502 described above.

5.3 Configuration of Electrical Home Appliance 3402

Next, a detailed configuration of the electrical home appliance 3402 according to the fifth embodiment will be described.

Figure 36:
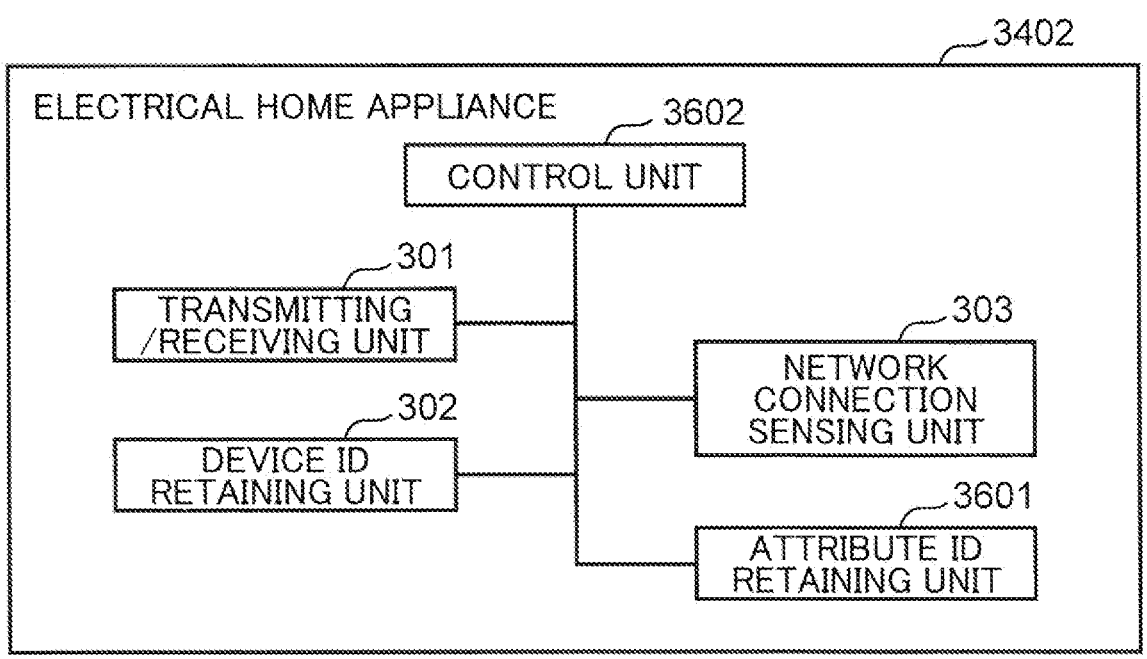
FIG. 36 is a diagram showing a configuration of an electrical home appliance according to the fifth embodiment of the present invention.

FIG. 36 is a diagram showing a configuration of an electrical home appliance according to the fifth embodiment of the present invention. As shown in FIG. 36, the electrical home appliance 3402 includes a transmitting/receiving unit 301, a device ID retaining unit 302, a network connection sensing unit 303, an attribute ID retaining unit 3601, and a control unit 3602.

The electrical home appliance 3402 includes a microprocessor, a RAM, a ROM, a hard disk, and the like which are not specifically illustrated. The RAM, the ROM, and the hard disk store a computer program. As the microprocessor operates according to the computer program, functions of the electrical home appliance 3402 are realized.

Moreover, the respective functional blocks of the transmitting/receiving unit 301, the device ID retaining unit 302, the network connection sensing unit 303, the attribute ID retaining unit 3601, and the control unit 3602 may be realized by an LSI that is typically an integrated circuit. The respective functional blocks may be individually configured as single chips. Alternatively, one or more functional blocks or a part of a functional block may constitute a single chip.

While the term LSI has been used herein, other terms such as an IC, a system LSI, a super LSI, or an ultra LSI may be used depending on varying degrees of integration.

In addition, a method of circuit integration is not limited to an LSI and may be realized using a dedicated circuit or a general-purpose processor. An FPGA (Field Programmable Gate Array) that can be programmed after LSI production or a reconfigurable processor that allows connection or reconfiguration of circuit cells inside an LSI after LSI production may also be used.

Moreover, if techniques for realizing integrated circuits to replace LSIs should emerge due to progress made in semiconductor technology or due to derivative technology, it is obvious that the functional blocks may be integrated using such techniques. Examples of circuit integration technology which may possibly replace LSIs include an adaptation of biotechnology.

Finally, each functional block may be realized by software or by a combination of an LSI and software. In addition, the software may be tamper resistant.

Moreover, since configurations of the transmitting/receiving unit 301, the device ID retaining unit 302, and the network connection sensing unit 303 are similar to those of the first embodiment, a description thereof will be omitted.

(1) Attribute ID Retaining Unit 3601

The attribute ID retaining unit 3601 retains an identifier (an attribute ID) for uniquely identifying a home (a family), a user, a group, or the like to which the electrical home appliance 3402 belongs. For example, the attribute ID may be a user account or a family account, a number generated therefrom, or an arbitrary number assigned to each family, each user, or each group.

(2) Control Unit 3602

The control unit 3602 realizes functions of the electrical home appliance 3402 by managing and controlling the transmitting/receiving unit 301, the device ID retaining unit 302, the network connection sensing unit 303, the attribute ID retaining unit 3601, and the control unit 3602 described above.

5.4 Operation of Information Management System

An example of an operation for confirming connection of the electrical home appliance 3402 to the network and whether log information of the electrical home appliance 3402 is to be provided will now be described with reference to FIGS. 38 to 41.

Figure 38:
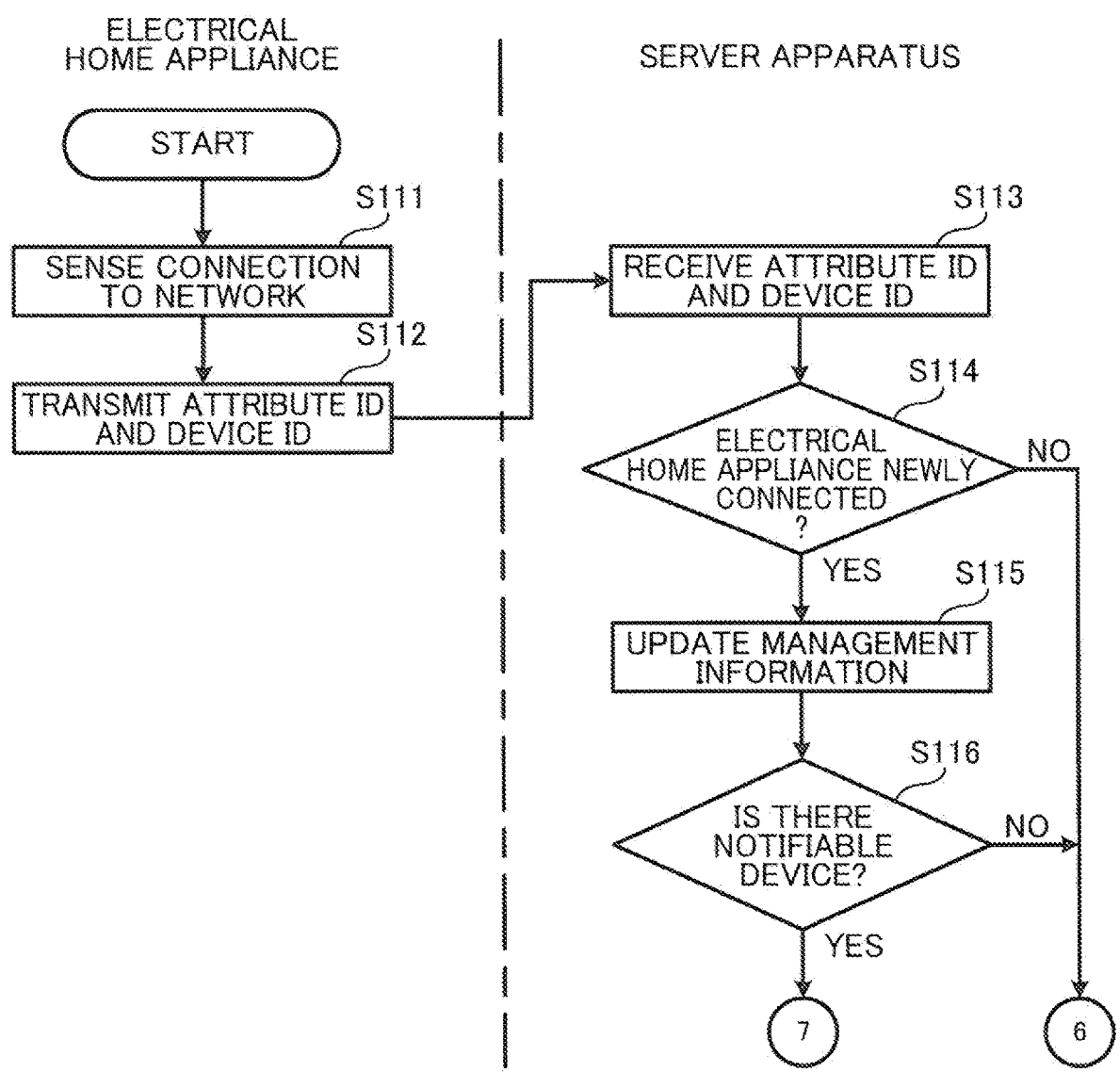
FIG. 38 is a first flow chart for describing an operation by the information management system according to the fifth embodiment of the present invention.
Figure 39:
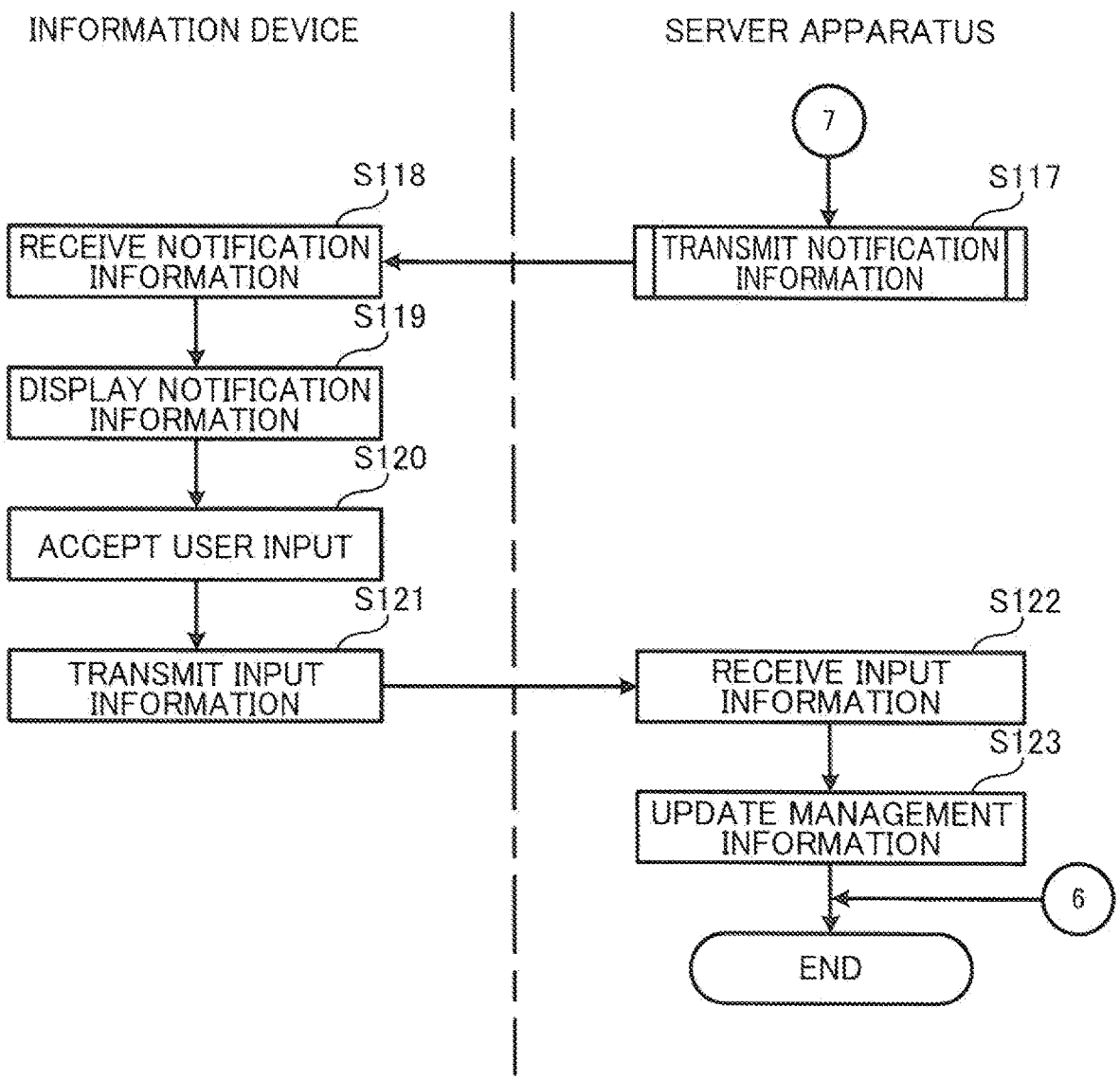
FIG. 39 is a second flow chart for describing an operation by the information management system according to the fifth embodiment of the present invention.

FIG. 38 is a first flow chart for describing an operation by the information management system according to the fifth embodiment of the present invention, and FIG. 39 is a second flow chart for describing an operation by the information management system according to the fifth embodiment of the present invention.

First, the network connection sensing unit 303 of the electrical home appliance 3402 senses that the electrical home appliance 3402 has been connected to the network (connected to the server apparatus 3401) (step S111).

When connection to the network is sensed, the transmitting/receiving unit 301 transmits the attribute ID retained by the attribute ID retaining unit 3601 and the device ID retained by the device ID retaining unit 302 to the server apparatus 3401 (step S112).

Next, the transmitting/receiving unit 201 of the server apparatus 3401 receives the attribute ID and the device ID transmitted by the electrical home appliance 3402 (step S113).

Subsequently, based on the received attribute ID and device ID and the management information retained by the management information retaining unit 3501, the determining unit 204 determines whether or not an electrical home appliance has been newly connected or, in other words, whether or not an electrical home appliance corresponding to the received device ID is a newly connected electrical home appliance (step S114).

Specifically, the determining unit 204 refers to the management information retained by the management information retaining unit 3501 and determines whether or not there is a device ID matching the received device ID among the plurality of device IDs associated with the received attribute ID. When there is a device ID matching the received device ID among the plurality of device IDs associated with the received attribute ID, the determining unit 204 determines that the electrical home appliance corresponding to the received device ID is not a newly connected electrical home appliance. In addition, when there is no device ID matching the received device ID among the plurality of device IDs associated with the received attribute ID, the determining unit 204 determines that the electrical home appliance corresponding to the received device ID is a newly connected electrical home appliance.

At this point, when it is determined that an electrical home appliance is not newly connected or, in other words, when it is determined that the electrical home appliance corresponding to the received device ID is not a newly connected electrical home appliance (NO in step S114), the process is terminated.

On the other hand, when it is determined that an electrical home appliance is newly connected or, in other words, when it is determined that the electrical home appliance corresponding to the received device ID is a newly connected electrical home appliance (YES in step S114), the updating unit 205 updates the management information retained by the management information retaining unit 3501 based on the received attribute ID and device ID (step S115).

Next, based on the received attribute ID and the management information retained by the management information retaining unit 3501, the determining unit 204 determines whether or not there is a notifiable device among the one or more electrical home appliances 3402 or information devices 104 corresponding to the received attribute ID or, in other words, whether there is an electrical home appliance 3402 having a display or an information device 104 (step S116). At this point, when it is determined that there is no electrical home appliance 3402 having a display or information device 104 (NO in step S116), the process is terminated.

On the other hand, when it is determined that there is an electrical home appliance 3402 having a display or an information device 104 (YES in step S116), the transmitting/receiving unit 201 transmits the notification information retained by the notification information retaining unit 203 to the electrical home appliance 3402 having a display or the information device 104 (step S117). Moreover, in this case, the transmitting/receiving unit 201 transmits the notification information to the information device 104.

Next, the transmitting/receiving unit 501 of the information device 104 receives the notification information transmitted by the server apparatus 3401 (step S118).

Subsequently, the display unit 502 displays the received notification information (step S119).

The input accepting unit 503 then accepts an input (a response) by the user with respect to the notification information (step S120).

Next, the transmitting/receiving unit 501 transmits input information of the user as accepted by the input accepting unit 503 to the server apparatus 3401 (step S121). In this case, the input information includes information indicating whether or not log information is to be provided.

Subsequently, the transmitting/receiving unit 201 of the server apparatus receives the input information transmitted by the information device 104 (step S122).

Next, the updating unit 205 updates the management information retained by the management information retaining unit 3501 in accordance with permission information which is included in the input information and which indicates whether or not log information of the user is to be provided (step S123).

An operation of the notification information transmitting process in step S117 in FIG. 39 will now be further described.

Figure 40:
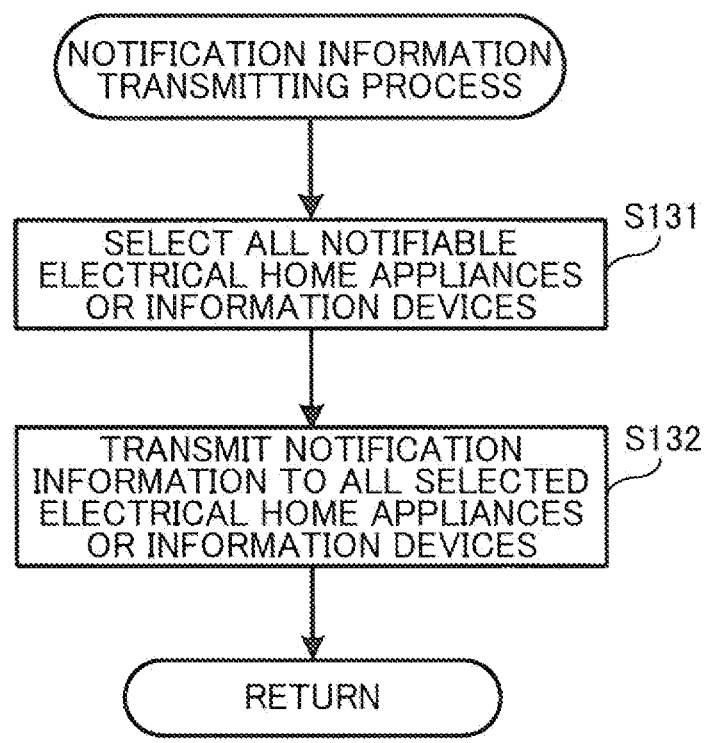
FIG. 40 is a flow chart for describing an operation of a notification information transmitting process in step S117 in FIG. 39.

FIG. 40 is a flow chart for describing the operation of the notification information transmitting process in step S117 in FIG. 39.

First, the selecting unit 206 of the server apparatus 3401 selects all electrical home appliances with displays (notifiable electrical home appliances 3402) or information devices 104 based on the received attribute ID and the management information that is retained by the management information retaining unit 3501 (step S131).

Next, the transmitting/receiving unit 201 transmits the notification information that is retained by the notification information retaining unit 203 to the electrical home appliance 3402 or the information device 104 selected by the selecting unit 206 (step S132).

Another operation of the notification information transmitting process in step S117 in FIG. 39 will now be further described.

Figure 41:
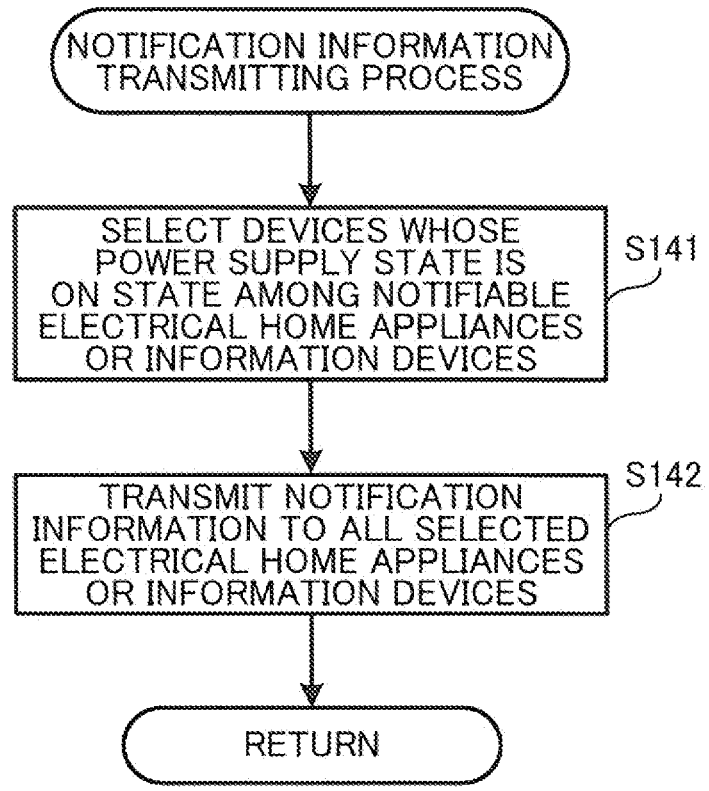
FIG. 41 is a flow chart for describing another operation of the notification information transmitting process in step S117 in FIG. 39.

FIG. 41 is a flow chart for describing another operation of the notification information transmitting process in step S117 in FIG. 39.

First, the selecting unit 206 of the server apparatus 3401 selects devices whose power supply state is in an on state among electrical home appliances 3402 with displays (notifiable electrical home appliances 3402) or information devices 104 based on the received attribute ID and the management information that is retained by the management information retaining unit 3501 (step S141).

Next, the transmitting/receiving unit 201 transmits the notification information that is retained by the notification information retaining unit 203 to the electrical home appliance 3402 or the information device 104 selected by the selecting unit 206 (step S142).

In this manner, the transmitting/receiving unit 201 of the server apparatus 3401 receives a device ID and an attribute ID from the one electrical device (the electrical home appliance 3402) via the first network. In addition, when it is determined that the one electrical device is a newly connected electrical device, the transmitting/receiving unit 201 provides the notification information via the second network to an information display apparatus corresponding to the attribute ID of the one electrical device using a second database that manages the attribute ID and the information display apparatus in association with each other.

The techniques described in the embodiments above may be realized by, for example, the following types of cloud services. However, the types of cloud services that realize the techniques described in the embodiments above are not limited to the following types.

(Service Type 1: Proprietary Data Center Type Cloud Service)

Figure 42:
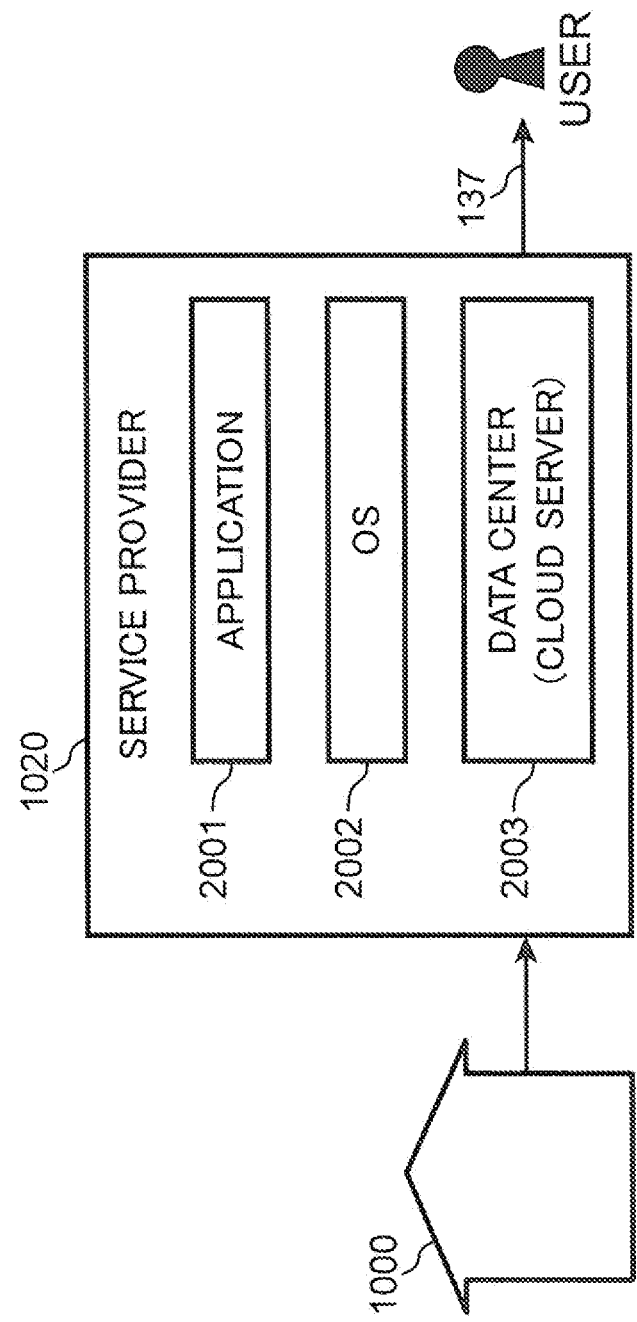
FIG. 42 is a diagram showing an overview of a service that is provided by an information management system of service type 1 (proprietary data center type cloud service).

FIG. 42 is a diagram showing an overview of a service that is provided by an information management system of service type 1 (a proprietary data center type cloud service). In the present type, the service provider 1020 acquires information from the group 1000 and provides service to a user. In the present type, the service provider 1020 is equipped with functions of a data center operating company. In other words, the service provider 1020 owns a cloud server 1011 that manages big data. Therefore, a data center operating company does not exist.

In the present type, the service provider 1020 operates and manages a data center (a cloud server) 2003. In addition, the service provider 1020 manages an operating system (OS) 202 and an application 2001. The service provider 1020 provides service using the OS 2002 and the application 2001 managed by the service provider 1020 (an arrow 137).

(Service Type 2: Cloud Service Using IaaS)

Figure 43:
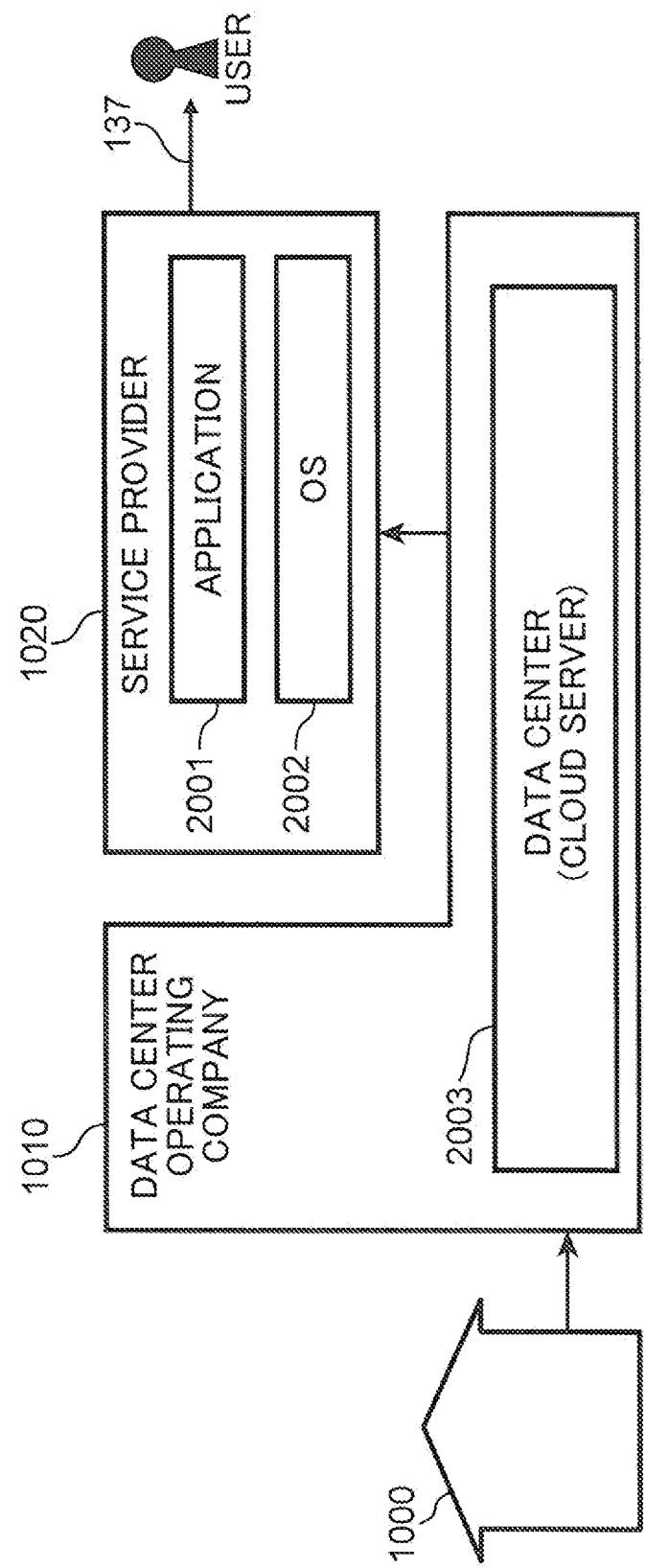
FIG. 43 is a diagram showing an overview of a service that is provided by an information management system of service type 2 (cloud service using IaaS).

FIG. 43 is a diagram showing an overview of a service that is provided by an information management system of service type 2 (a cloud service using IaaS). In this case, IaaS stands for infrastructure as a service and refers to a cloud service provision model where an infrastructure for building and running a computer system itself is provided as an Internet-based service.

In the present type, the data center operating company 1010 operates and manages the data center (the cloud server) 2003. In addition, the service provider 1020 manages an OS 2002 and the application 2001. The service provider 1020 provides service using the OS 2002 and the application 2001 managed by the service provider 1020 (the arrow 137).

(Service Type 3: Cloud Service Using PaaS)

Figure 44:
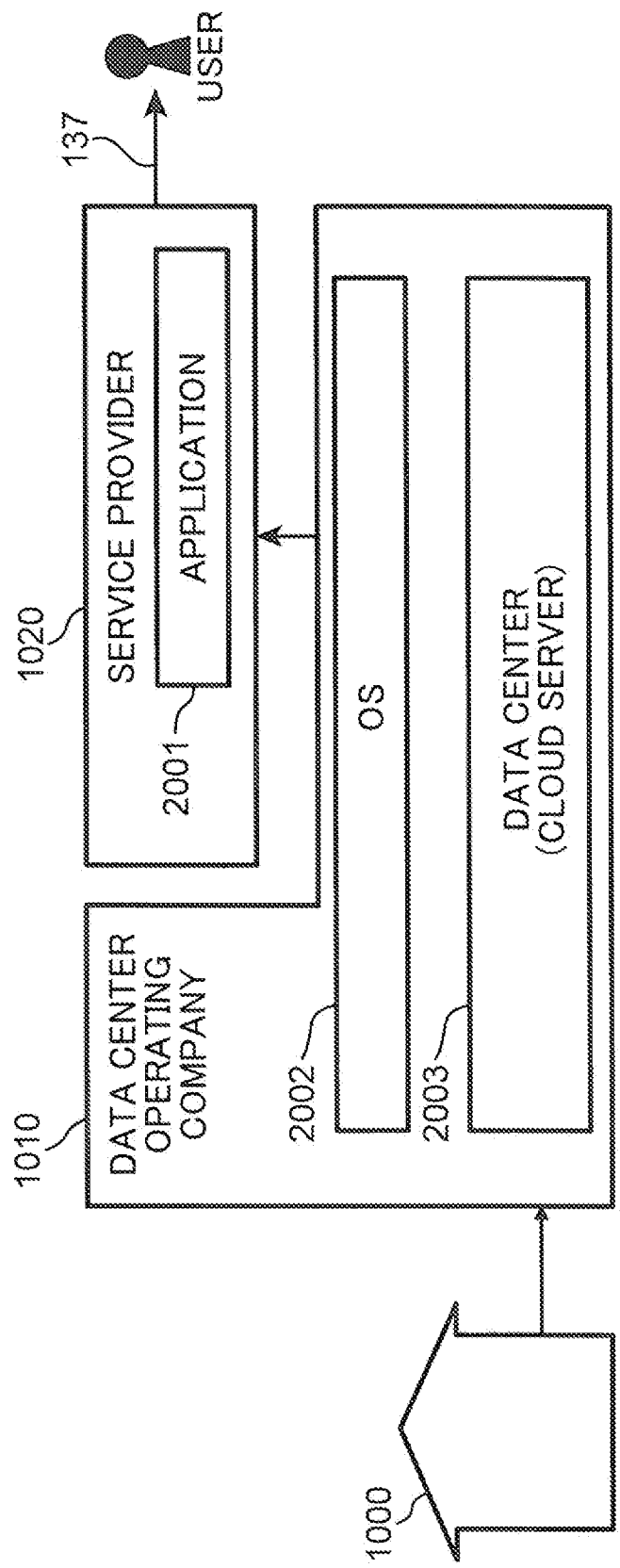
FIG. 44 is a diagram showing an overview of a service that is provided by an information management system of service type 3 (cloud service using PaaS).

FIG. 44 is a diagram showing an overview of a service that is provided by an information management system of service type 3 (a cloud service using PaaS). In this case, PaaS stands for platform as a service and refers to a cloud service provision model where a platform that constitutes a foundation for building and running software is provided as an Internet-based service.

In the present type, the data center operating company 1010 manages the OS 2002 and operates and manages the data center (the cloud server) 2003. In addition, the service provider 1020 manages the application 2001. The service provider 1020 provides service using the OS 2002 managed by the data center operating company 1010 and the application 2001 managed by the service provider 1020 (the arrow 137).

(Service Type 4: Cloud Service Using SaaS)

Figure 45:
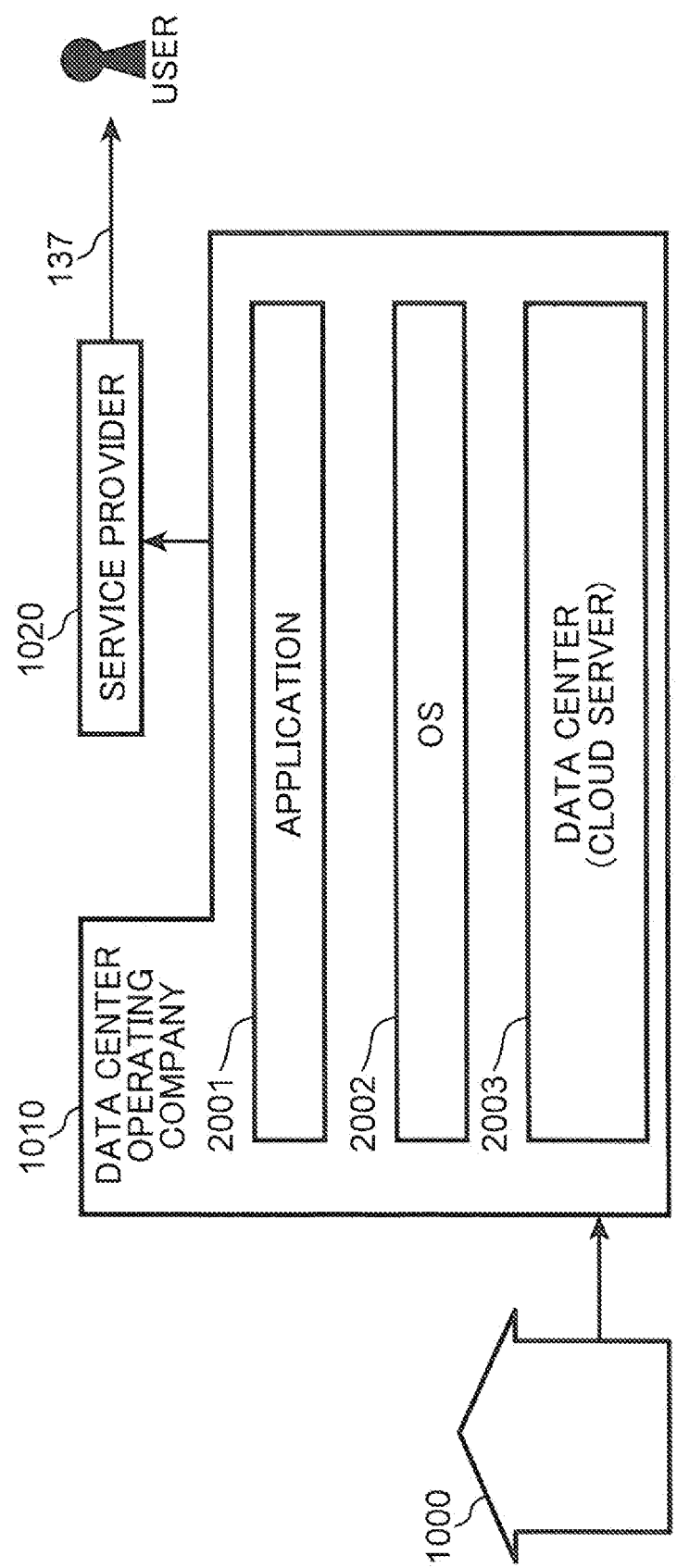
FIG. 45 is a diagram showing an overview of a service that is provided by an information management system of service type 4 (cloud service using SaaS).

FIG. 45 is a diagram showing an overview of a service that is provided by an information management system of service type 4 (a cloud service using SaaS). In this case, SaaS stands for software as a service. The cloud service using SaaS is a cloud service provision model equipped with, for example, a function that enables a user such as a company or an individual that does not own a data center (a cloud server) to use an application provided by a platform provider that owns a data center (a cloud server) via a network such as the Internet.

In the present type, the data center operating company 1010 manages the application 2001, manages the OS 2002, and operates and manages the data center (the cloud server) 2003. In addition, the service provider 1020 provides service using the OS 2002 and the application 2001 managed by the data center operating company 1010 (the arrow 137).

As described above, the service provider 1020 provides service in all types of cloud services. In addition, for example, an OS, an application, a database for big data, and the like may be developed in-house or may be outsourced by the service provider or the data center operating company.

INDUSTRIAL APPLICABILITY

The information management method according to the present invention is capable of confirming with a user as to whether or not collection of log information is to be permitted regardless of whether or not an electrical device has a display or regardless of a size of a display included in the electrical device and is useful as an information management method in an information management system that manages log information indicating usage of one or more electrical devices.

The invention claimed is:

1. A method for managing information in an information management system that manages information related to one or more devices,
the method comprising:
receiving, via a network, a device ID indicating one device among the one or more devices and an attribute ID indicating that the one device belongs to a same owner, a same group, or a same home as the one or more devices, the one device being equipped without a notification unit or being equipped with only a simplified notification unit;
referring to a first database that manages a device which is the management target, and stores at least device IDs indicating the one or more devices and attribute IDs in association with each other;
determining whether or not a combination of the received device ID and attribute ID already exists in the first database, and determining that the one device belonging to the same owner, the same group, or the same home is not the management target when the combination of the received device ID and attribute ID does not exist in the first database; and
when the one device belonging to the same owner, the same group, or the same home is determined not to be the management target, providing, via the network, an information providing apparatus, which is associated with the attribute ID and which differs from the one device, with first notification information for confirming whether or not the one device is determined to be the management target,
receiving, from the information providing apparatus, response information including information indicating whether or not the one device is determined to be the management target; and
when the received information indicates that the one device is determined to be the management target, the one device is determined to be the management target, after updating the first database in accordance with the response information.

2. The method according to claim 1, wherein
the device ID and the attribute ID are transmitted via a first network; and
the first notification information is transmitted via a second network.

3. The method according to claim 2, comprising:
receiving the device ID and the attribute ID from a gateway connected to the one device via the first network; and
providing, when the one device is determined not to be the management target, the first notification information via the second network to the information providing apparatus associated with the attribute ID of the one device, using a second database that manages the attribute ID and the associated information providing apparatus.

4. The method according to claim 2, comprising:
receiving the device ID indicating the one device and the attribute ID indicating that the one device belongs to the same owner, the same group, or the same home as the one or more devices from a gateway connected to the one device, via the first network;
transmitting the first notification information to the gateway, via the second network, when the one device is determined not to be the management target; and
providing the first notification information, via the gateway, to the information providing apparatus, based on a device ID that indicates the information providing apparatus and is managed by the gateway.

5. The method according to claim 2, comprising:
receiving the device ID and the attribute ID from the one device, via the first network; and
providing, when the one device is determined not to be the management target, the first notification information, via the second network, to the information providing apparatus associated with the attribute ID of the one device, using a second database that manages the attribute ID and the associated information providing apparatus.

6. The method according to claim 2, wherein a plurality of information providing apparatuses includes the information providing apparatus,
the method comprising:
acquiring a power supply state indicating whether a power supply is in an on state or an off state from the plurality of information providing apparatuses, via the first network;
identifying an information providing apparatus whose power supply is in the on state from among the plurality of information providing apparatuses on the basis of the acquired power supply state; and
providing the first notification information to the identified information providing apparatus.

7. The method according to claim 2, wherein a plurality of information providing apparatuses includes the information providing apparatus,
the method comprising:
acquiring a power supply state indicating whether a power supply is in an on state or an off state and an operation status indicating whether or not an operation is in progress from the plurality of information providing apparatuses, via the first network;
identifying an information providing apparatus whose power supply is in the on state and which is in operation from among the plurality of information providing apparatuses on the basis of the acquired power supply state and operation status; and
providing the first notification information to the identified information providing apparatus.

8. The method according to claim 1, wherein
a plurality of information providing apparatuses includes the information providing apparatus, and
the first notification information is provided to all of the plurality of information providing apparatuses.

* * * * *